US008478369B2

(12) United States Patent
Ogatsu

(10) Patent No.: US 8,478,369 B2
(45) Date of Patent: Jul. 2, 2013

(54) MOBILE DEVICE

(75) Inventor: Toshinobu Ogatsu, Tokyo (JP)

(73) Assignee: NEC Corporation, Tokyo (JP)

(*) Notice: Subject to any disclaimer, the term of this patent is extended or adjusted under 35 U.S.C. 154(b) by 680 days.

(21) Appl. No.: 12/593,428

(22) PCT Filed: Mar. 28, 2008

(86) PCT No.: PCT/JP2008/056031
§ 371 (c)(1),
(2), (4) Date: Dec. 7, 2009

(87) PCT Pub. No.: WO2008/120701
PCT Pub. Date: Oct. 9, 2008

(65) Prior Publication Data
US 2010/0120479 A1 May 13, 2010

(30) Foreign Application Priority Data
Mar. 30, 2007 (JP) ................................. 2007-091598

(51) Int. Cl.
*H04M 1/00* (2006.01)
(52) U.S. Cl.
USPC ................... 455/575.4; 455/575.1; 361/725; 361/727
(58) Field of Classification Search
None
See application file for complete search history.

(56) References Cited

U.S. PATENT DOCUMENTS

| 7,433,723 | B2 | 10/2008 | Bae | |
|---|---|---|---|---|
| 2004/0157653 | A1* | 8/2004 | Kato | 455/575.4 |
| 2006/0104013 | A1 | 5/2006 | Sakakibara et al. | |
| 2007/0161271 | A1 | 7/2007 | Seo | |

FOREIGN PATENT DOCUMENTS

| JP | H08-181749 A | 7/1996 |
|---|---|---|
| JP | 2001175608 A | 6/2001 |
| JP | 2002094624 A | 3/2002 |
| JP | 2002152347 A | 5/2002 |
| JP | 2003-229934 A | 8/2003 |
| JP | 2003234809 A | 8/2003 |
| JP | 2003319042 A | 11/2003 |
| JP | 2004235897 A | 8/2004 |
| JP | 2004253480 A | 9/2004 |
| JP | 2005065205 A | 3/2005 |
| JP | 2005244592 A | 9/2005 |
| JP | 2005269566 A | 9/2005 |
| JP | 2005286994 A | 10/2005 |
| JP | 2005303663 A | 10/2005 |

(Continued)

OTHER PUBLICATIONS

International Search Report for PCT/JP2008/056031 mailed May 20, 2008.
U.S. Office Action for U.S. Appl. No. 12/593,429 dated Jul. 17, 2012.
US Office Action for U.S. Appl. No. 12/593,429 issued Dec. 20, 2011.
Japanese Office Action for JP 2009-507509 mailed on Mar. 7, 2013 with English Translation.

*Primary Examiner* — Zhiyu Lu

(57) ABSTRACT

A mobile device includes a first housing and a second housing. The first housing includes a first track surface parallel to a first direction, and a first housing first flat surface perpendicular to the first direction. The second housing includes a first pin, and a second housing first flat surface facing to the first housing first flat surface. The first pin protrudes from the second housing first flat surface. The second housing first flat surface slides along the first housing first flat surface, and the first pin slides along the first track surface, therefore the second housing slides with respect to the first housing. The mobile device is provided, in which smooth sliding without backlash is possible.

15 Claims, 29 Drawing Sheets

FOREIGN PATENT DOCUMENTS

| | | |
|---|---|---|
| JP | 2005323242 A | 11/2005 |
| JP | 2005341480 A | 12/2005 |
| JP | 2006005564 A | 1/2006 |
| JP | 2006093999 A | 4/2006 |
| JP | 2006165854 A | 6/2006 |
| JP | 2006173794 A | 6/2006 |
| JP | 2006246353 A | 9/2006 |
| JP | 2006270804 A | 10/2006 |
| JP | 2006319419 A | 11/2006 |
| JP | 2006333079 A | 12/2006 |
| JP | 2006339698 A | 12/2006 |

\* cited by examiner

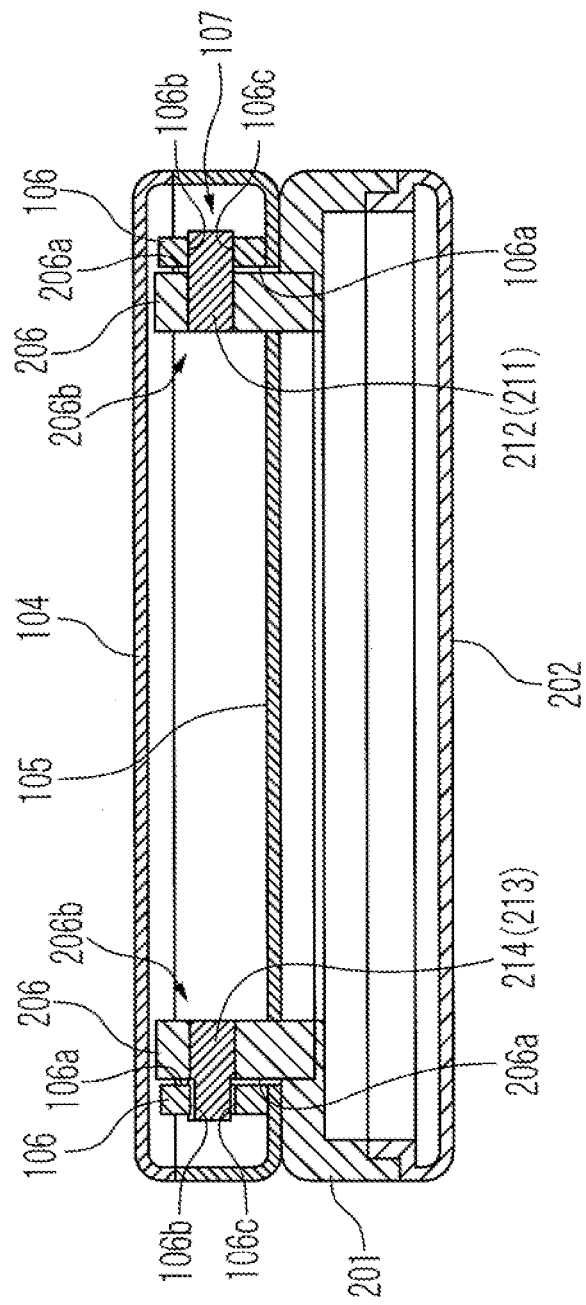

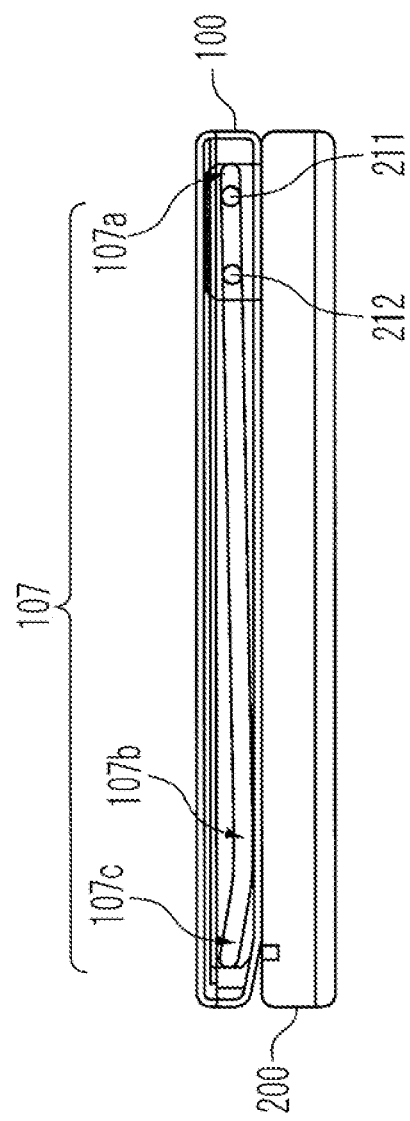

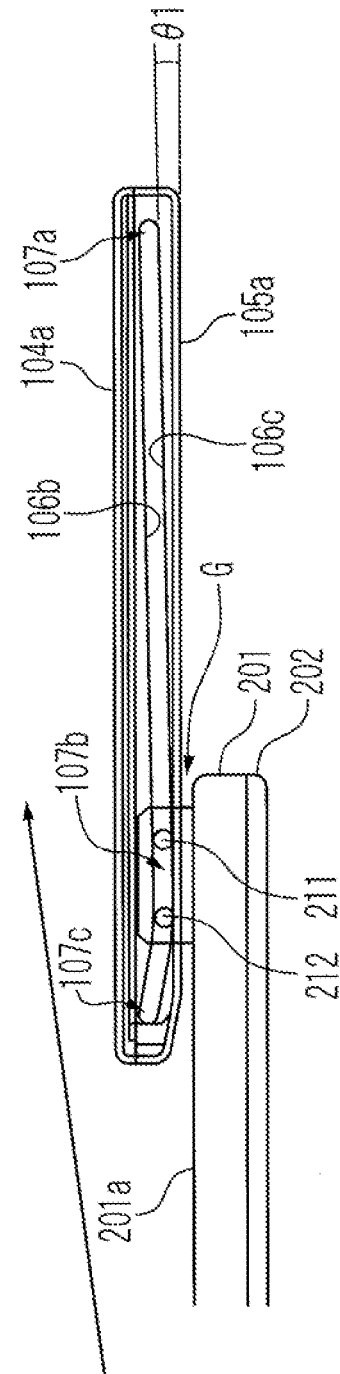

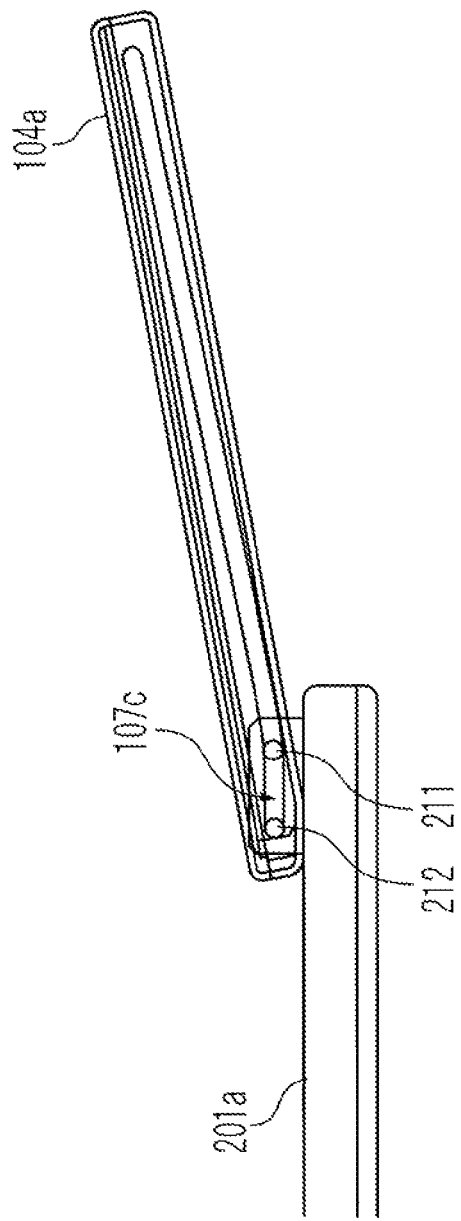

MOBILE DEVICE

TECHNICAL FIELD

The present invention relates to a mobile device such as a cellular phone, a digital camera, and a personal digital assistant, and more particularly, to a mobile device including a sliding mechanism.

BACKGROUND ART

In recent years, mobile devices have been required to have many functions such as telephone call, e-mail communication, Internet connection, and game. For this reason, the mobile devices are required to incorporate a large screen display device, and a key operation part having a certain degree of size to enhance operability for a character input. On the other hand, the mobile devices are required to be miniaturized. To meet both of the requirements, there are proposed mobile devices including various mechanisms. For example, a flip-type mobile device including a folding mechanism and a slide-type mobile device including a sliding mechanism are proposed.

Each of Japanese Laid-Open Patent Applications JP-P2003-234809A, JP-P2004-235897A, JP-P2005-269566A, JP-P2005-286994A, and JP-P2006-5564A discloses a mobile device including a sliding mechanism.

DISCLOSURE OF INVENTION

An object of the present invention is to provide a smoothly slidable mobile device without backlash.

A mobile device according to the present invention includes a first housing and a second housing. The first housing includes a first track surface parallel to a first direction, and a first housing first flat surface perpendicular to the first direction. The second housing includes a first pin, and a second housing first flat surface facing to the first housing first flat surface. The first pin protrudes from the second housing first flat surface. The second housing first flat surface slides along the first housing first flat surface. The first pin slides along the first track surface.

According to the present invention, a smoothly slidable mobile device without backlash is provided.

BRIEF DESCRIPTION OF THE DRAWINGS

The above and other objects, advantages and features of the present invention will be more apparent from the following description of certain preferred exemplary embodiments taken in conjunction with the accompanying drawings, in which:

FIG. 7 a cross-sectional view illustrating the mobile device according to the first exemplary embodiment;

FIG. 8A is a side view for describing a sliding operation of the mobile device according to the first exemplary embodiment;

FIG. 8B is a side view for describing the sliding operation of the mobile device according to the first exemplary embodiment;

FIG. 8C is a side view for describing the sliding operation of the mobile device according to the first exemplary embodiment;

BEST MODE FOR CARRYING OUT THE INVENTION

Exemplary embodiments of the present invention will hereinafter be described with reference to the accompanying drawings.

First Exemplary Embodiment

Figure 1:
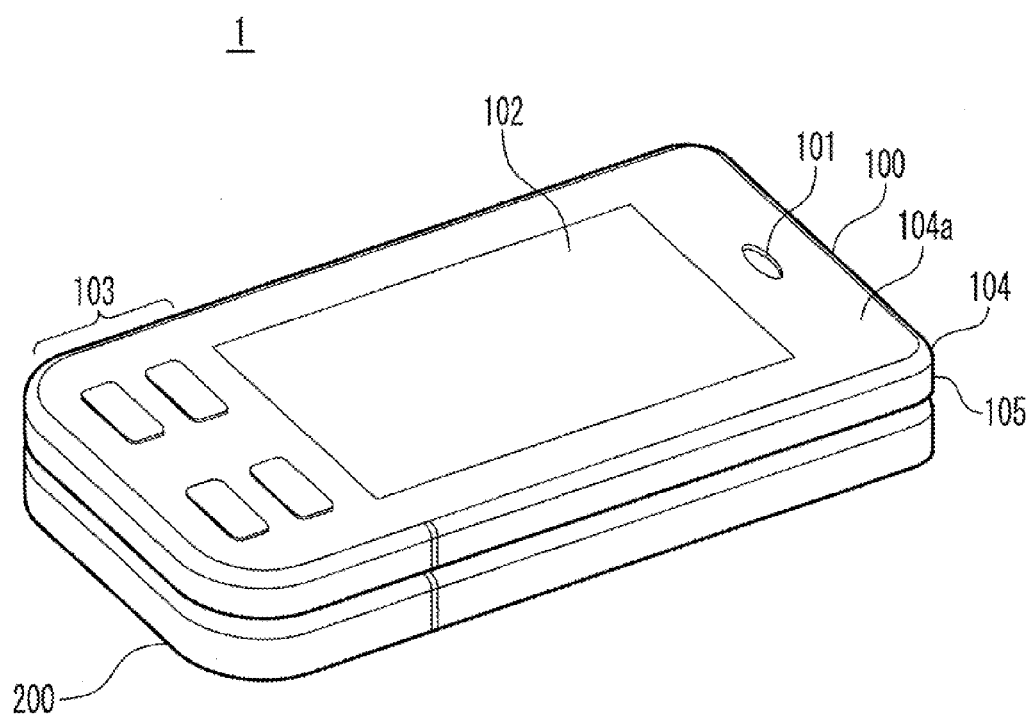
FIG. 1 is a perspective view illustrating a housed state of a mobile device according to a first exemplary embodiment of the present invention.

FIG. 1 illustrates a housed state of a mobile device 1 according to a first exemplary embodiment of the present invention. The mobile device 1 includes an upper housing 100 and a lower housing 200. The upper housing 100 and lower housing 200 are slid relatively to each other, and thereby the mobile device 1 comes into the housed state (shortened state) where the upper housing 100 and the lower housing 200 overlap with each other, or an extended state where the upper housing 100 and the lower housing 200 are displaced relatively to each other. The upper housing 100 includes a receiver 101, a display part 102, a basic operation key part 103, an upper cover 104, and an upper frame 105. The receiver 101, the display part 102, and the basic operation key part 103 are mounted in the upper cover 104. The receiver 101, the display part 102, and the basic operation key part 103 are arranged on a display surface 104a of the upper cover 104.

Figure 2:
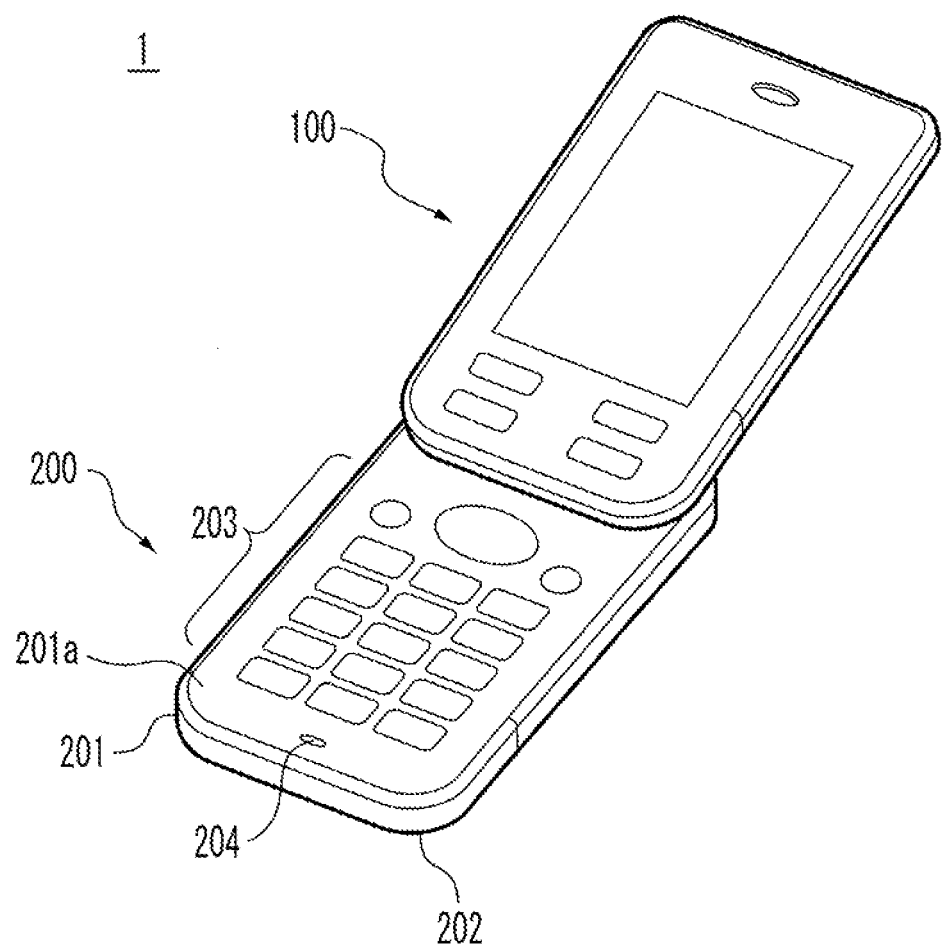
FIG. 2 is a perspective view illustrating an extended state of the mobile device according to the first exemplary embodiment.

FIG. 2 illustrates the extended state of the mobile device 1. The lower housing 200 includes a lower frame 201 and a lower cover 202. On a key operation surface 201a of the lower frame 201, a key operation part 203 and a microphone 209 are provided.

Figure 3:
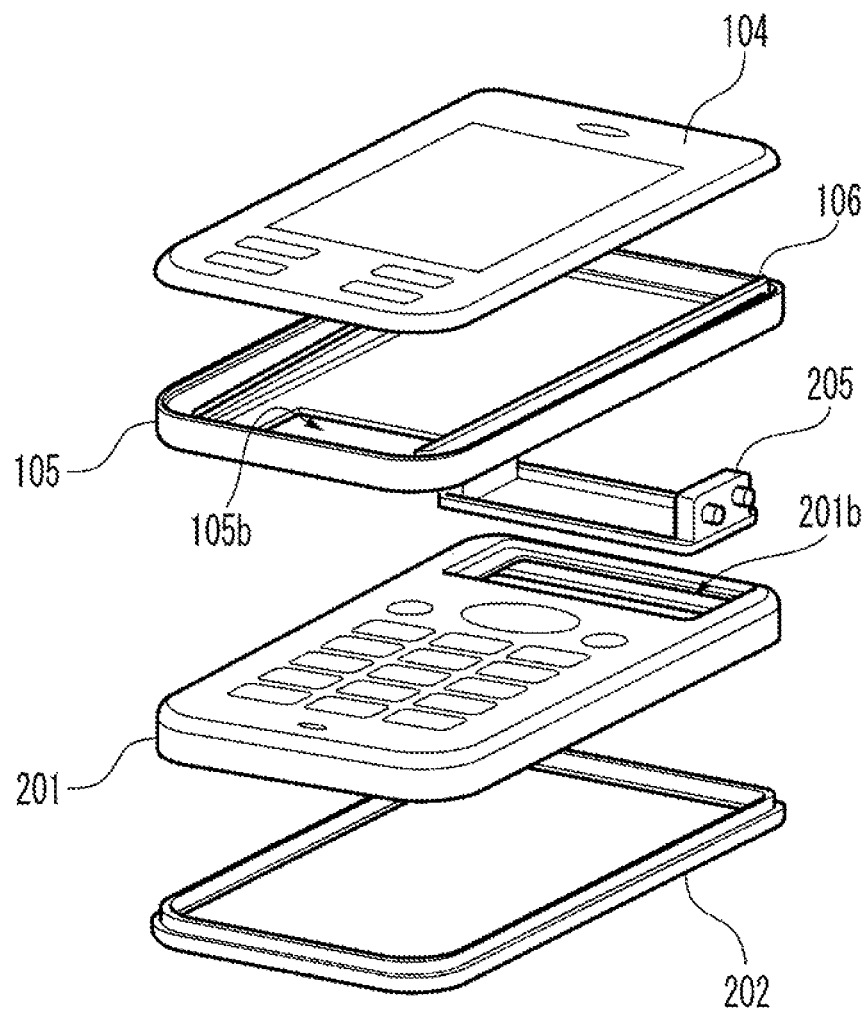
FIG. 3 is an exploded view of the mobile device according to the first exemplary embodiment.

FIG. 3 illustrates the mobile device 1 being disassembled. The upper frame 105 has a box shape of which one surface is opened. The upper cover 104 closes the opened surface of the upper frame 105. Guide parts 106 are fixed to the upper frame 105. The upper frame 105 is provided with an upper cable hole 105b. The lower frame 210 has a box shape of which one surface is opened. The lower cover 202 closes the opened surface of the lower frame 201. The lower frame 201 is provided with a lower cable hole 201b. A support member 205 included in the lower housing 200 is fixed to a part where the lower cable hole 201b of the lower frame 201 is provided. The guide parts 106 and the support member 205 are included in a sliding mechanism of the mobile device 1.

Figure 4:
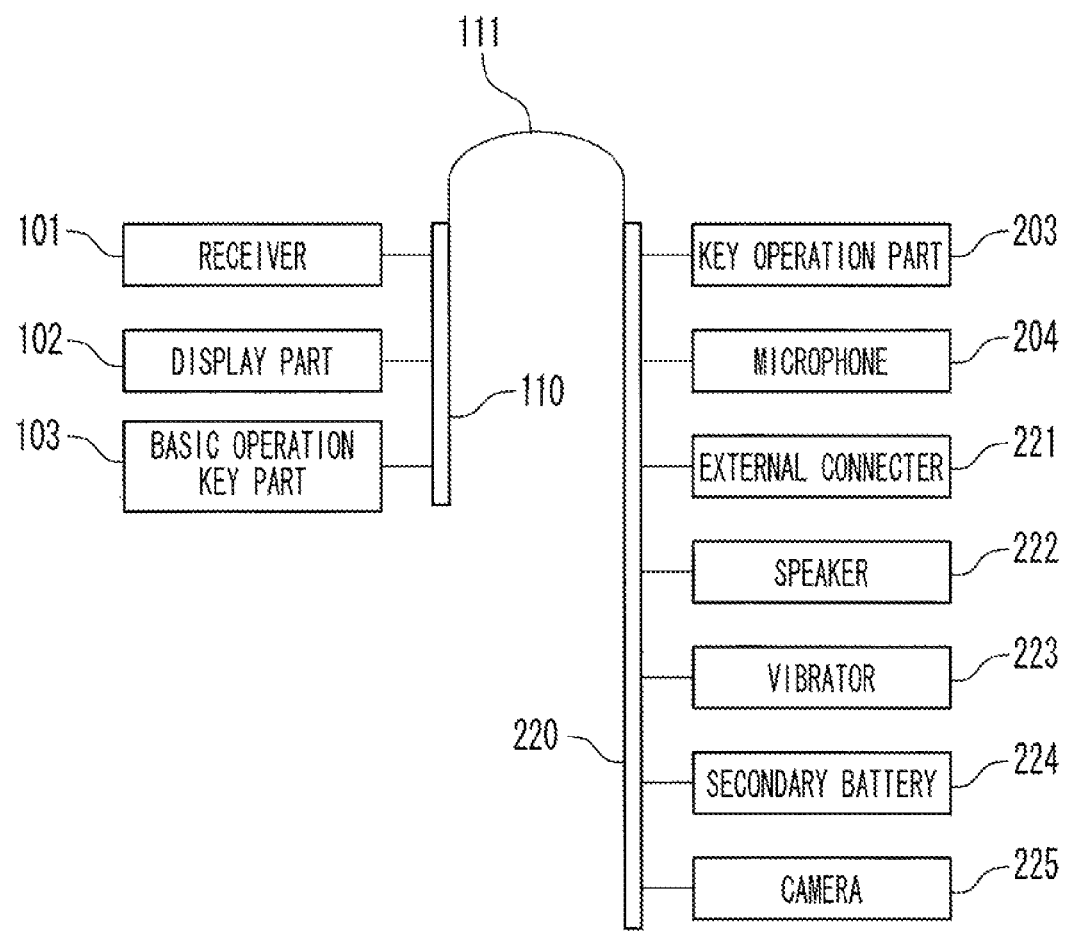
FIG. 4 is a block diagram of the mobile device according to the first exemplary embodiment.

FIG. 4 illustrates a block diagram of the mobile device 1. The upper housing 100 incorporates a sub board 110. The lower housing 200 incorporates major Components such as a main board 220, an external connector 221, a speaker 222, a vibrator 223, a secondary battery 224, and a camera 225. The mobile device 1 includes a flexible cable 111. The receiver 101, the display part 102, and the basic operation key part 103 are connected to the sub board 110. The key operation part 203, the microphone 209, the external connector 221, the speaker 222, the vibrator 223, the secondary battery 224, and the camera 225 are connected to the main board 220. The flexible cable 111 passes through the upper cable hole 105b and the lower cable hole 201b to connect between the sub board 110 and the main board 220.

Figure 5:
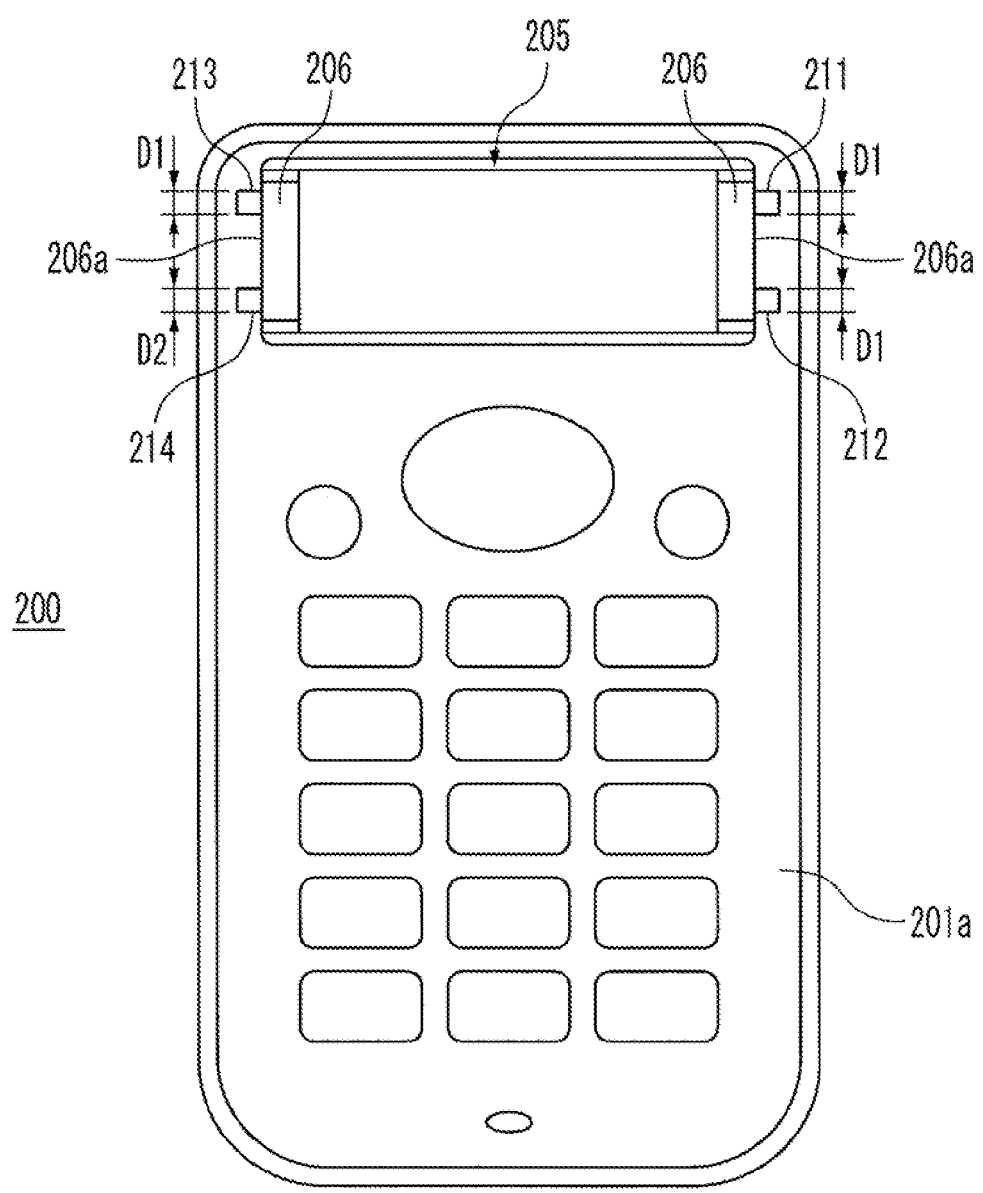
FIG. 5 is a front view of a lower housing according to the first exemplary embodiment.

FIG. 5 illustrates a front view of the lower housing 200 as viewed from a direction perpendicular to the key operation surface 201a. The support member 205 is arranged on the key operation surface 201a. The support member 205 includes a pair of right and left base parts 206, and pins 211 to 219. The right base part 206 includes a flat surface 206a facing rightward. The pins 211 and 212 protrude rightward from the flat surface 206a facing rightward. The left base part 206 includes a flat surface 206a facing leftward. The pins 213 and 219 protrude leftward from the flat surface 206a facing leftward. The pins 211 to 219 are cylindrical bodies of which axial directions correspond to a horizontal direction. Diameters of the pins 211 to 213 are D1. A diameter of the pin 214 is D2. Each of the pins 211 to 214 is supported by the base part 206.

Figure 6:
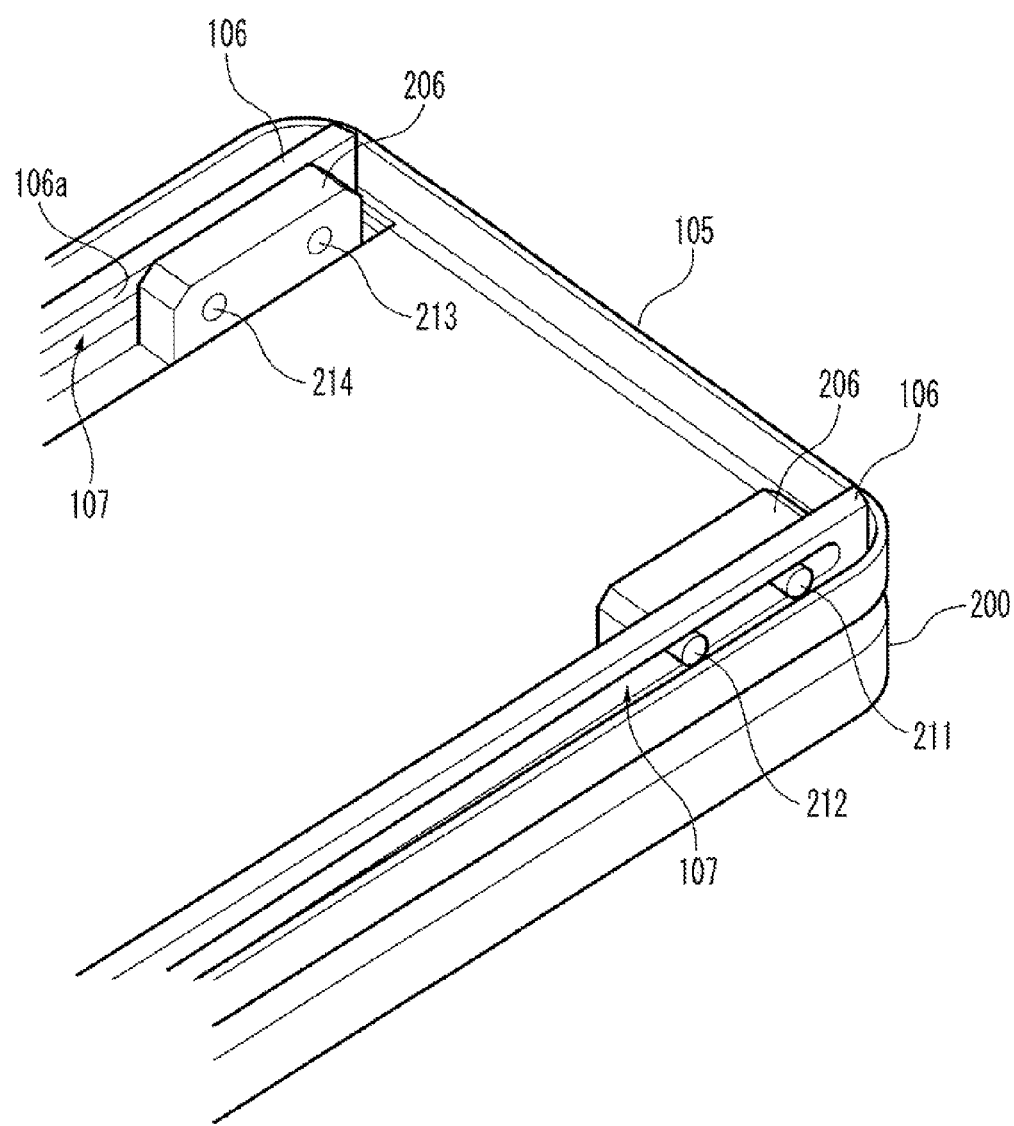
FIG. 6 is a perspective view illustrating a state where an upper cover of the mobile device according to the first exemplary embodiment is removed.

FIG. 6 illustrates a state where the upper cover 104 of the mobile device 1 is removed. The upper frame 105 is fixed with a pair of the right and left guide parts 106. Each of the guide parts 106 includes a flat surface 106a perpendicular to the horizontal direction. Each of the guide parts 106 is provided with a slit 107 along the flat surface 106a. In the slit 107 of the right guide part 106, the pins 211 and 212 are arranged. In the slit 107 of the left guide part 106, the pins 213 and 214 are arranged.

FIG. 7 illustrates a cross-sectional view of the mobile device 1. The flat surface 106a of the right guide part 106 faces to the flat surface 206a of the right base part 206. The flat surface 106a of the left guide part 106 faces to the flat surface 206a of the left base part 206. The guide part 106 includes track surfaces 106b and 106c facing to the slit 107. The track surfaces 106b and 106c are parallel to the horizontal direction, and face to each other. Each of the pins 211 to 214 is arranged between the track surfaces 106b and 106c. Each of the pins 211 to 214 fits into a pin fitting hole 206b provided in the base part 206. A cylindrical surface of each of the pins 211 to 214 is parallel to the horizontal direction. The cylindrical surface of each of the pins 211 to 213 comes into contact with the track surfaces 106b and 106c along a contact line parallel to the horizontal direction. The flat surfaces 106a and 206a are perpendicular to the horizontal direction. When the upper housing 100 and the lower housing 200 are slid relatively to each other, each of the pins 211 to 214 moves inside the slit 107 along the slit 107. When the upper housing 100 and the lower housing 200 are slid relatively to each other, each of the pins 211 to 213 slides along the track surfaces 106b and 106c, and the flat surfaces 106a and 206a slide with being in contact with each other. The track surfaces 106b and 106c and the pins 211 to 213 constrain relative movement between the upper housing 100 and the lower housing 200 in a direction that is perpendicular to the sliding directions of the upper housing 100 and the lower housing 200 (directions along the track surfaces 106b and 106c), and a normal direction of sliding surfaces (track surfaces 106b and 106c). In the mobile device 1, the contacts between the track surfaces 106b and 106c and the pins 211 to 213 are line contacts, and therefore moment in a pitching direction is received by the lines. The moment in the pitching direction is moment attempting to rotate one of the upper and lower housings 100 and 200 relatively to the other one around an axis parallel to the horizontal direction. The flat surfaces 106a and 206a constrain relative movement between the upper and lower housings 100 and 200 in a direction (horizontal direction) that is perpendicular to the sliding directions of the upper and lower housings 100 and 200, and parallel to the sliding surfaces. In the mobile device 1, the contacts between the flat surfaces 106a and 206a are plane contacts, and therefore moment in a yawing direction is received by the planes. The moment in the yawing direction is moment attempting to rotate one of the upper and lower housings 100 and 200 relatively to the other one around an axis perpendicular to both of the sliding directions of the upper and lower housings 100 and 200 and the horizontal direction. The flat surface 106a includes: a one-side portion extending along the slit 107 over an entire length of the slit 101 on one side of the slit 107; and another-side portion extending along the slit 107 over the entire length of the slit 107 on the other side of the slit 107. The flat surface 206a includes: a portion coming into contact with the one-side portion of the flat surface 106a; and the other portion coming into contact with the other-side portion of the flat surface 106a. A sufficient contact area is ensured between the flat surfaces 106a and 206a.

In order to smoothly slide the upper and lower housings 100 and 200 relatively to each other, it is preferable to lubricate an inside of the slit 107 with grease. Instead of using the grease, the use of solid lubrication typified by silicon based, graphite based, or molybdenum disulfide based lubrication is also effective.

The base part 206 may fixedly support each of the pins 211 to 214, but, preferably, supports it rotatably around its axis. Uneven wear of the pins 211 to 214 can be prevented. The uneven wear can be further prevented by lubricating the pin fitting holes 206b to smooth the rotation of the pins 211 to 214.

FIGS. 8A to 8C are side views for describing a sliding operation of the mobile device 1. FIG. 8A illustrates the mobile device 1 in the housed state. FIG. 8B illustrates the mobile device 1 in a sliding operation. FIG. 8C illustrates the mobile device 1 in the extended state. In FIGS. 8A to 8C, the upper housing 100 is expressed as if it is transparent.

As illustrated in FIG. 8A, the slit 107 includes: an end part 107a; an end part 107c positioned on a side opposite to the end part 107a; and a bend portion 107b arranged between the end parts 107a and 107c. The pins 211 and 212 are arranged in the end part 107a in the housed state of the mobile device 1. The pins 213 and 214 are also arranged in the end part 107a in the housed state of the mobile device 1. The pin 212 is arranged at a position closer to the end part 107c than the pin 211. The pin 214 is arranged at a position closer to the end part 107c than the pin 213.

As illustrated in FIG. 83, the upper housing 100 includes a back surface 105a parallel to the display surface 104s on a side opposite to the display surface 104a. The back surface 105a faces in a direction opposite to the display surface 104a. In the housed state of the mobile device 1, the back surface 105a overlaps with the key operation surface 201a with facing to the key operation surface 201a. The back surface 105a and the key operation surface 201a are parallel to each other in the horizontal direction. The slit 107 is sloped at a slope angle of θ1 with respect to the back surface 105a in a portion thereof between the end part 107a and the bend portion 107b. The track surface 106b is a flat surface sloped at the slope angle of θ1 with respect to the back surface 105a in a portion thereof between the end part 107a and the bend portion 107b such that a gap between the track surface 106b and the back surface 105a decreases from the end part 107a toward the bend portion 107b. The track surface 106c is a flat surface sloped at the slope angle of θ1 with respect to the back surface 105a in a portion thereof between the end part 107a and the bend portion 107b such that a gap between the track surface 106c and the back surface 105a decreases from the end part 107a toward the bend portion 107b. The slit 107 is bent in the bend portion 107b. Each of the track surfaces 106b and 106c has a curved surface in a part thereof corresponding to the bend portion 107b. The slit 107 is sloped with respect to the back surface 105a in a portion thereof between the bend portion 107b and the end part 107c. The track surface 106b is sloped with respect to the back surface 105a in a portion thereof between the bend portion 107b and the end part 107c such that the gap between the track surface 106b and the back surface 105a increases from the bend portion 107b toward the end part 107c. The track surface 106c is sloped with respect to the back surface 105a in a portion thereof between the bend portion 107b and the end part 107c such that the gap between the track surface 106c and the back surface 105a increases from the bend portion 107b toward the end part 107c.

Figure 9:
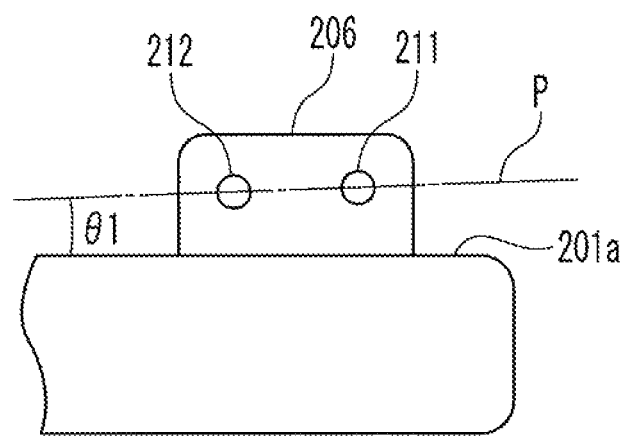
FIG. 9 is a side view of the lower housing according to the first exemplary embodiment.

As illustrated in FIG. 9, a plane P including the axes of the pins 211 and 212 (pins 213 and 214) is sloped at the slope angle of θ1 with respect to the key operation surface 201a such that a gap between an axis of the pin 211 (pin 213) and the key operation surface 201a is made larger than that between the pin 212 (pin 214) and the key operation surface 201a.

Accordingly, as illustrated in FIG. 8B, when the upper housing 100 is slid relatively to the lower housing 200 from a state where the pins 211 and 212 (pins 213 and 214) are arranged in the end part 107a to a state where they are arranged in the bend portion 107b, a gap G between the key operation surface 201a and the back surface 105a is increased. At this time, the back surface 105a and the key operation surface 201a are kept parallel to each other. When the upper housing 100 is slid relatively to the lower housing 200 from the state where the pins 211 and 212 (pins 213 and 214) are arranged in the end part 107a to the state where they are arranged in the bend portion 107b, the key operation surface 201a can be prevented from being rubbed by the upper housing 100.

When the upper housing 100 is slid relatively to the lower housing 200 from the state where the pins 211 and 212 (pins 213 and 214) are arranged in the bend portion 107b to a state where they are arranged in the end part 107c, the display surface 104a rises with respect to the key operation surface 201a. At this time, the gap G between the back surface 105a and the key operation surface 201a is sufficiently formed, and therefore interference between the upper housing 100 and the lower housing 200 can be prevented.

FIG. 8C illustrates the mobile device 1 in the state where the pins 211 and 212 (pins 213 and 214) are arranged in the end part 107c, and the display surface 109a rises with respect to the key operation surface 201a. At this time, the display surface 109a is sloped with respect to the key operation surface 201a such that the receiver 101 and the microphone 209 take adequate positions for telephone call.

The pin 214 preferably has the diameter D2 smaller than that D1 so as not to obstruct the sliding operation of the mobile device 1. The diameter D2 is determined on the basis of the diameter D1 and a dimensional tolerance of a width of the slit 107 (gap between the track surfaces 106b and 106c). In this case, a positional relationship between the upper housing 100 and the lower housing 200 is determined by the pins 211 to 213. In the case where the positional relationship is determined by three points, i.e., the pins 211 to 213, it is not necessary to form the track surfaces 106b and 106c in a bilaterally symmetrical shape. It is possible to freely design shapes of the track surfaces 106b and 106c based on a design of the mobile device 1. The pin 214 is an auxiliary pin that functions in case where any of the pins 211 to 213 is damaged or excess load is applied to the mobile device 1. If there is no interference in terms of dimensional tolerance, the diameters D2 and D1 may be equal to each other. Any of the pins 211 to 214 may be the auxiliary pin.

Figure 10:
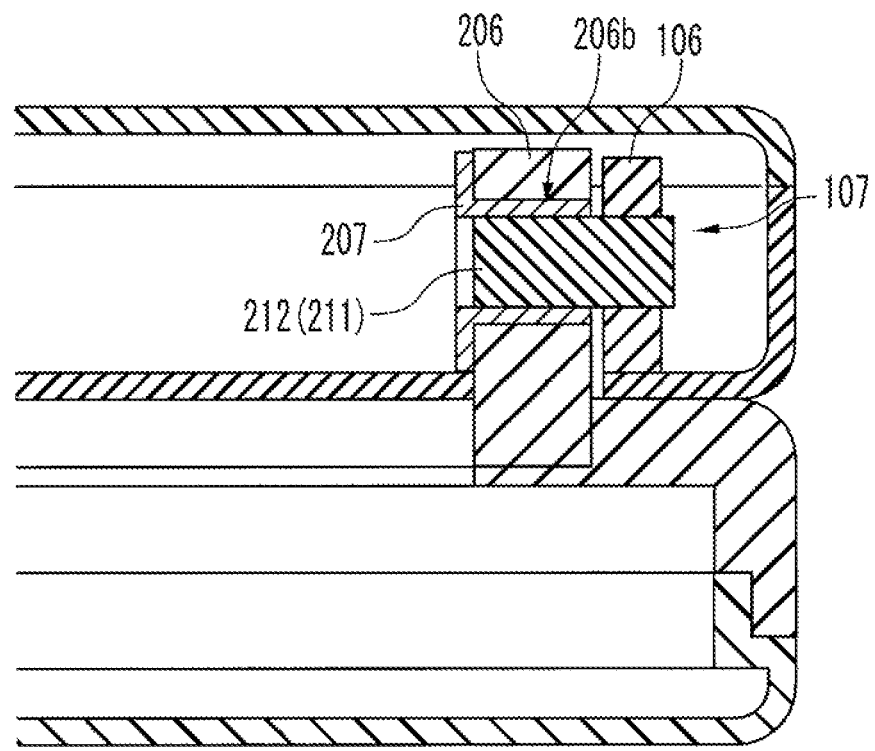
FIG. 10 is a cross-sectional view illustrating a first modification example of the mobile device according to the first exemplary embodiment.

FIG. 10 illustrates a first modification example of the mobile device 1. The base part 206 supports each of the pins 211 to 214 through a bushing 207 arranged in the pin fitting hole 206b. The rotation of the pins 211 to 214 around their axes becomes smooth, and the uneven wear of the pins 211 to 214 is effectively prevented. The bushing 207 is preferably a lubricating bushing. The bushing 207 may be a bearing.

Figure 11:
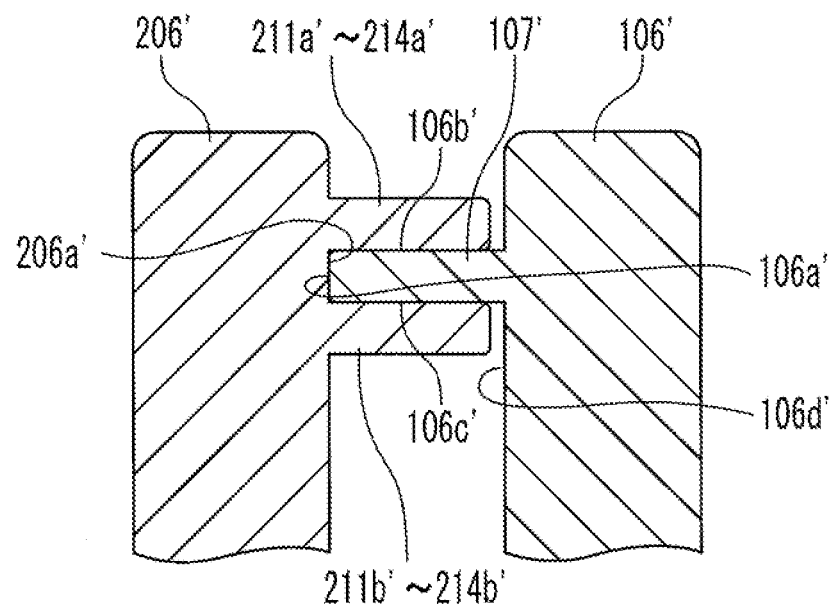
FIG. 11 is a cross-sectional view illustrating a second modification example of the mobile device according to the first exemplary embodiment.

FIG. 11 illustrates a second modification example of the mobile device 1. The guide part 106 is replaced by a guide part 106', and the base part 206 is replaced by a base part 206'. The pin 211 is replaced by pins 211a' and 211b'. Similarly, the pins 212 to 214 are replaced by pins 212a' to 214a' and 212b' to 214b', respectively. The guide part 106' includes a flat surface 106d' perpendicular to the horizontal direction. Along the flat surface 106d', a protruded strip portion 107' of a plate shape is provided. The protruded strip portion 107' includes: a flat surface 106a' perpendicular to the horizontal direction; and track surfaces 106b' and 106c' parallel to the horizontal direction. These surfaces extend over an entire length of the protruded strip portion 101'. The track surfaces 106b' and 106c' have the same shapes as those of the track surfaces 106b and 106c. The track surfaces 106b' and 106c' have a relationship between a front surface and a back surface of the plate shape. The base part 206' includes a flat surface 206a' corresponding to the flat surface 206a. The flat surface 206a' is perpendicular to the horizontal direction, and faces to the flat surface 106a'. The pins 211a' and 211b' (pins 212a' to 214a', and 212b' to 214b') protrude in the horizontal direction from the flat surface 206a'. The pin 211a' (pins 212a' to 214a') faces to the pin 211b' (pins 212b' to 214b') with sandwiching the protruded strip portion 107'. The pin 211a' (pins 212a' to 214a') is in contact with the track surface 106b'. The pin 211b' (pins 212b' to 214b') is in contact with the track surface 106c'. The flat surface 206a' is in contact with the flat surface 106a' with facing to the flat surface 106a'. The pin 211a' (pins 212a' to 214a') slides along the track surface 106b', the pin 211b' (pins 212b' to 214b') slides along the track surface 106c', and the flat surface 206a' slides along the flat surface 106a' and thereby the upper and lower housings 100 and 200 slide relatively to each other.

Figure 12:
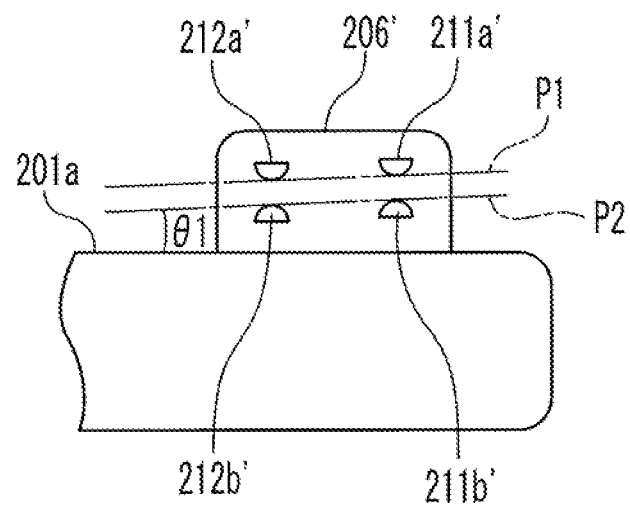
FIG. 12 is a side view illustrating the second modification example of the mobile device according to the first exemplary embodiment.

As illustrated in FIG. 12, the pin 211a' (pins 212a' to 214a') includes a curved surface parallel to the horizontal direction. The curved surface exhibits an arc shape in a cross section perpendicular to the horizontal direction. The curved surface comes into contact with the track surface 106b' along a contact line parallel to the horizontal direction. The pin 211b' (pins 212b' to 214b') includes a curved surface parallel to the horizontal direction. The curved surface exhibits an arc shape in a cross section perpendicular to the horizontal direction. The curved surface comes into contact with the track surface 106c' along a contact line parallel to the horizontal direction. A plane P1 including contact lines on which the pins 211a' and 212a' (pins 213a' and 214a') come into contact with the track surface 106b' is sloped at the slope angle of θ1 with respect to the key operation surface 201a such that a gap between the contact line between the pin 211a' (pin 213a) and the track surface 106b' and the key operation surface 201a is made larger than a gap between the contact line between the pin 212a' (pin 214a') and the track surface 106b' and the key operation surface 201a. A plane P2 including the contact lines on which the pins 211b' and 212b' (pins 213b' and 214b') come into contact with the track surface 106c' is sloped at the slope angle of θ1 with respect to the key operation surface 201a such that a gap between the contact line between the pin 211b' (pin 213b') and the track surface 106c' and the key operation surface 201a is made larger than a gap between the contact line between the pin 212b' (pin 214b') and the track surface 106c' and the key operation surface 201a. Accord-ingly, in the second modification example of the mobile device 1, sliding as illustrated in FIGS. 8A to 8C is possible.

Second Exemplary Embodiment

Figure 13:
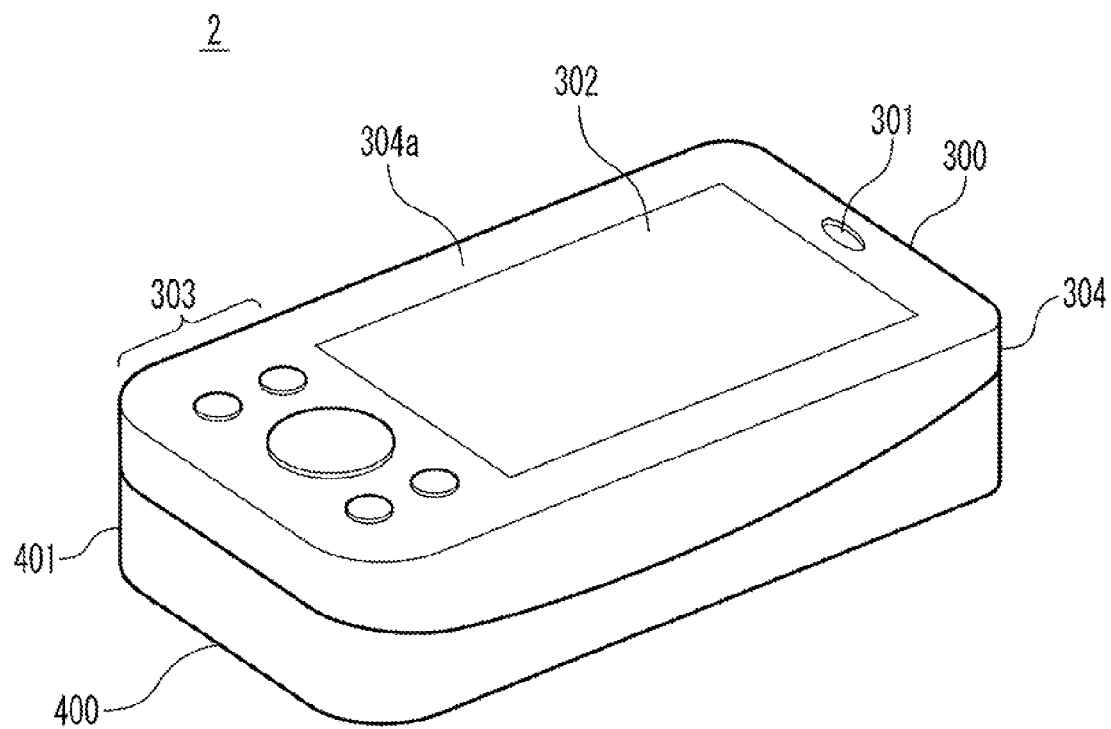
FIG. 13 is a perspective view illustrating a housed state of a mobile device according to a second exemplary embodiment of the present invention.

FIG. 13 illustrates a housed state of a mobile device 2 according to a second exemplary embodiment of the present invention. The mobile device 2 includes an upper housing 300 and a lower housing 400. The upper housing 300 and the lower housing 400 are slid relatively to each other, and thereby the mobile device 2 comes into the housed state (shortened state) where the upper housing 300 and the lower housing 400 overlap with each other, or an extended state where the upper housing 300 and the lower housing 400 are displaced relatively to each other. The sliding in the mobile device 2 is curved. The upper housing 300 includes a receiver 301, a display part 302, a basic operation key part 303, and an upper casing 304. The receiver 301, the display part 302, and the basic operation key part 303 are mounted in the upper casing 304. The receiver 301, display part 302, and basic operation key part 303 are arranged on a display surface 304a of the upper casing 309.

Figure 14:
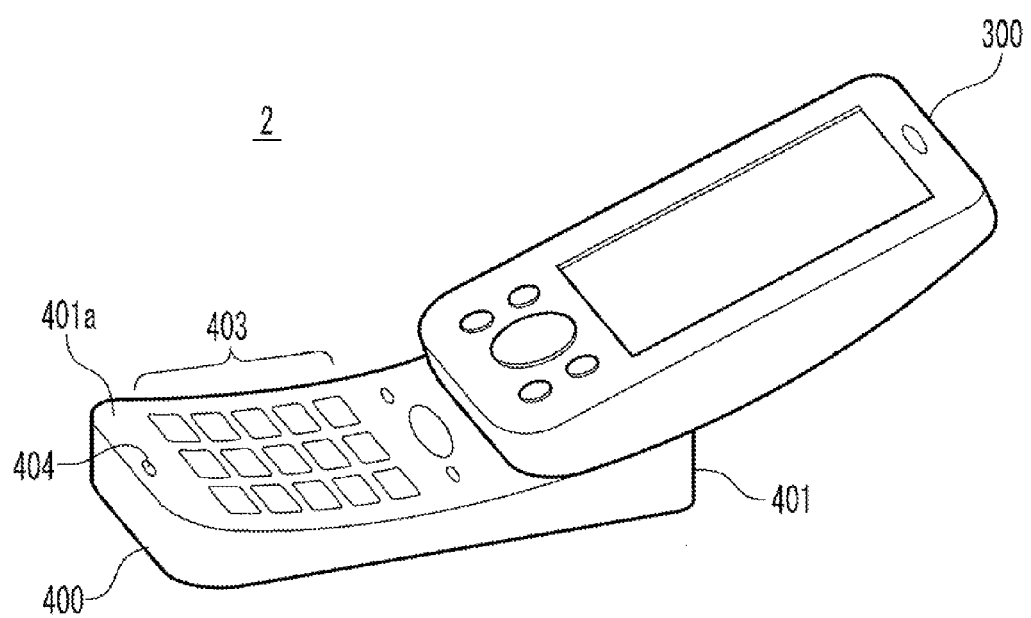
FIG. 14 is a perspective view illustrating an extended state of the mobile device according to the second exemplary embodiment.

FIG. 14 illustrates the extended state of the mobile device 2. The lower housing 400 includes a lower casing 401, a key operation part 403, and a microphone 404. On a key operation surface 401a of the lower casing 901, the key operation part 403 and the microphone 904 are provided.

Figure 15:
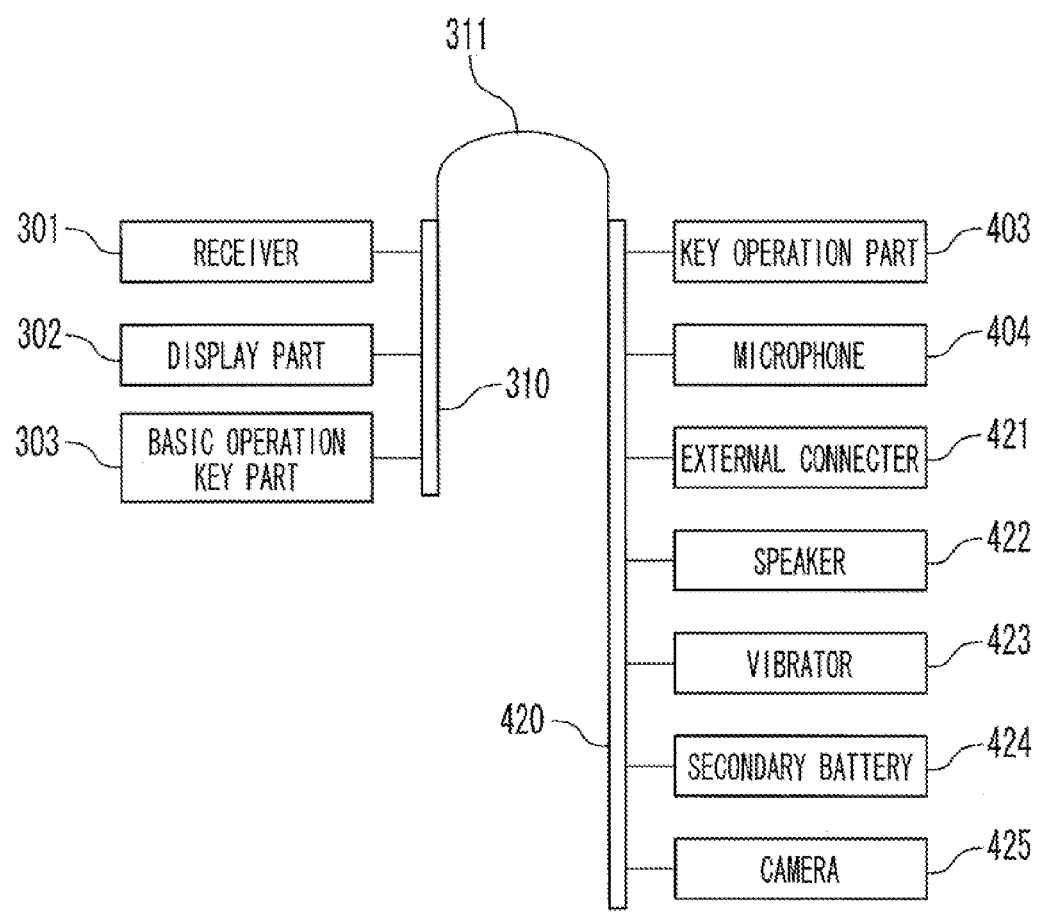
FIG. 15 is a block diagram of the mobile device according to the second exemplary embodiment.

FIG. 15 illustrates a block diagram of the mobile device 2. The upper housing 300 incorporates a sub board 310. The lower housing 400 incorporates major components such as a main board 420, an external connector 921, a speaker 422, a vibrator 423, a secondary battery 424, and a camera 425. The mobile device 2 includes a flexible cable 311. The receiver 301, the display part 302, and the basic operation key part 303 are connected to the sub board 310. The key operation part 403, the microphone 909, the external connector 421, the speaker 422, the vibrator 423, the secondary battery 424, and the camera 425 are connected to the main board 420. The flexible cable 311 passes through an upper cable hole provided in the upper casing 304 and a lower cable hole provided in the lower casing 401 to connect between the sub board 310 and the main board 420.

Figure 16A:
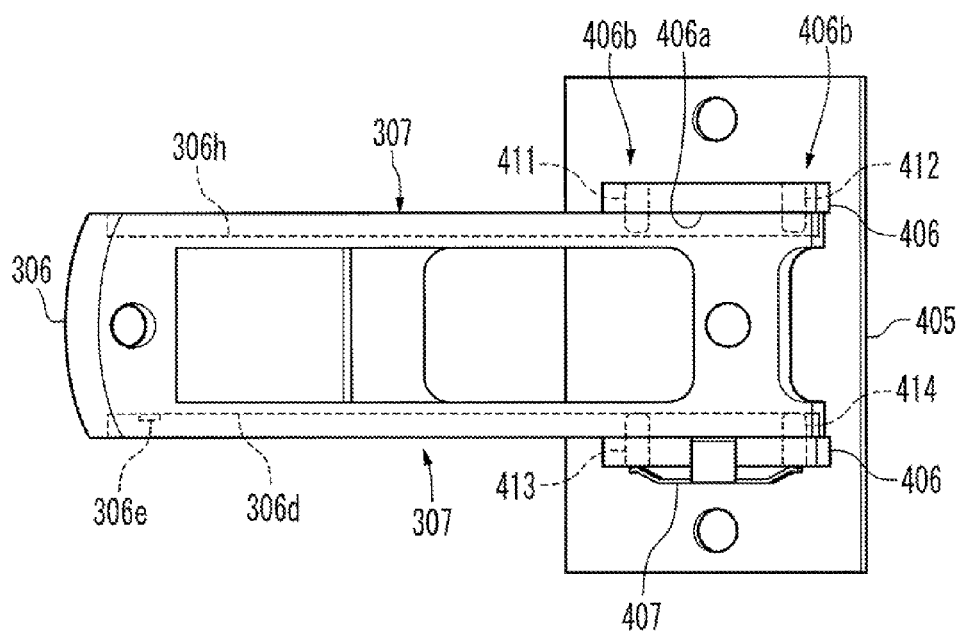
FIG. 16A is a front view of a sliding mechanism according to the second exemplary embodiment.
Figure 16B:
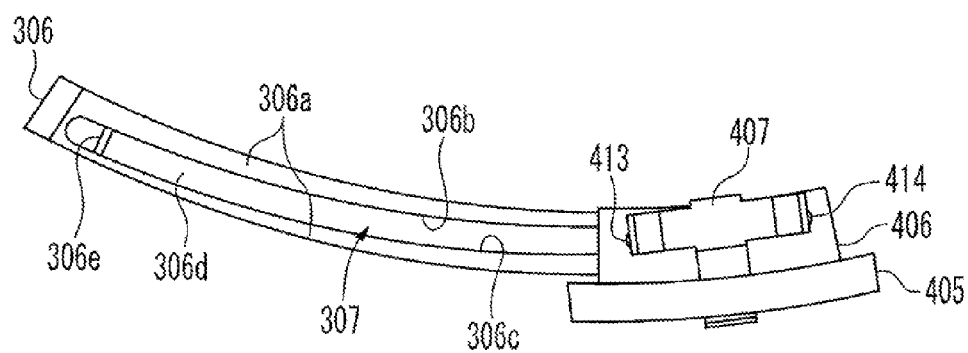
FIG. 16B is a side view of the sliding mechanism according to the second exemplary embodiment.
Figure 17:
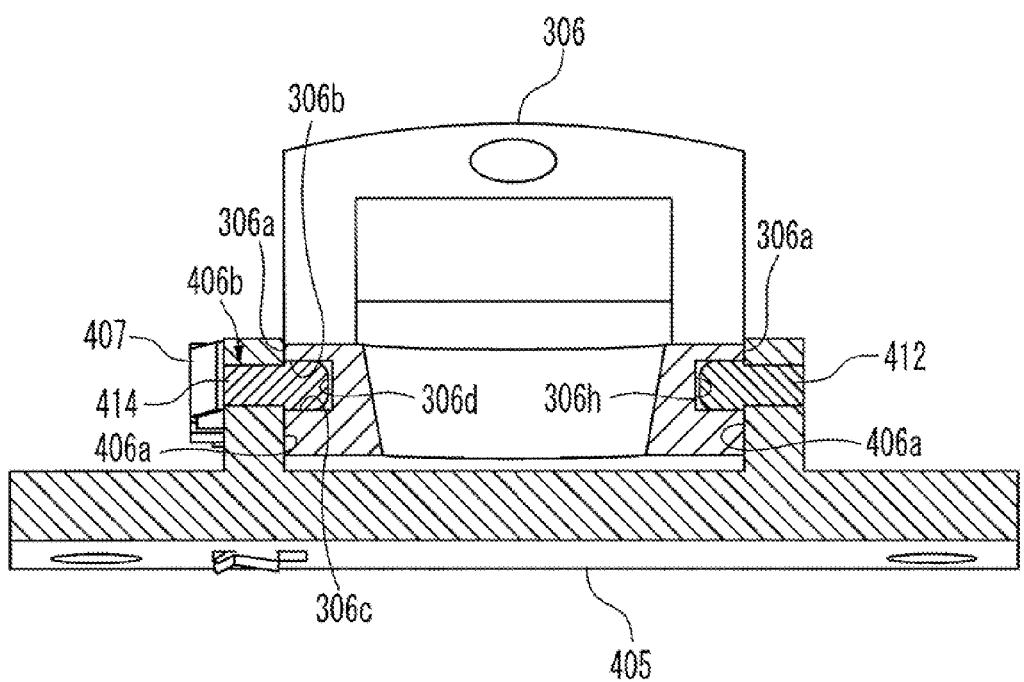
FIG. 17 is a cross-sectional view of the sliding mechanism according to the second exemplary embodiment.

FIGS. 16A and 16B illustrate a front view and a side view of a sliding mechanism of the mobile device 2, respectively. The sliding mechanism of the mobile device 2 includes a support component 405 and a guide part 306. The support component 405 is screwed into the lower casing 401 to be thereby fixed. The guide part 306 is screwed into the upper casing 304 to be thereby fixed. FIG. 17 illustrates a cross-sectional view of the guide part 306 and the support component 405.

The guide part 306 includes a pair of right and left flat surfaces 306a. Each of the flat surfaces 306a is perpendicular to the horizontal direction. The right flat surface 306a faces rightward. The left flat surface 306a faces leftward. A right groove 307 is provided along the right flat surface 306a, and a left groove 307 is provided along the left flat surface 306a. The support component 405 includes a pair of right and left base parts 406, and pins 411 to 414. Each of the pins 411 to 414 is a cylindrical body of which an axial direction corresponds to the horizontal direction, and fitted into a pin fitting hole 406b provided in the base part 406. The right base part 406 includes a flat surface 406a perpendicular to the horizontal direction. The flat surface 406a of the right base part 406 faces to the right flat surface 306a. The pins 411 and 412 are fixed to the right base part 406. Each of the pins 411 and 412 protrudes leftward from the flat surface 406a of the right base part 406. A tip of each of the pins 411 and 412 is arranged in the right groove 307. The left base part 406 includes a flat surface 406a perpendicular to the horizontal direction. The flat surface 406a of the left base part 406 faces to the left flat surface 306a. The left base part 406 supports each of the pins 413 and 414 such that each of the pins 413 and 414 can advance and retreat in its axial direction. Each of the pins 413 and 414 protrudes rightward from the flat surface 406a of the left base part 406. A tip of each of the pins 413 and 414 is arranged in the left groove 307. The guide part 306 includes track surfaces 306b and 306c as wall surfaces of the groove 307 for each of the grooves 307. The track surfaces 306b and 306c are parallel to the horizontal direction, and face to each other. The guide part 306 includes bottom surfaces 306h and 306d as bottom surfaces of the right and left grooves 307, respectively. The bottom surface 306h faces to the tips of the pins 411 and 412. The bottom surface 306d faces to the tips of the pins 413 and 414. The bottom surfaces 306d and 306h are flat surfaces perpendicular to the horizontal direction. A cylindrical surface of each of the pins 411 to 414 is parallel to the horizontal direction. The cylindrical surface of each of the pins 411 to 413 comes into contact with the track surfaces 306b and 306c along contact lines parallel to the horizontal direction. When the upper housing 300 and the lower housing 400 are slid relatively to each other, each of the pins 411 to 414 moves inside the groove 307 along the groove 307. When the upper housing 300 and the lower housing 400 are slid relative to each other, each of the pins 411 to 413 slides along the track surfaces 306b and 306c, and the flat surfaces 406a and 306a slide with being in contact with each other. In the mobile device 2, the contacts between the track surfaces 306b and 306c and the pins 411 to 413 are line contacts, and therefore moment in a pitching direction is received by the lines. In the mobile device 2, the contact between the flat surfaces 306a and 406a is a plane contact, and therefore moment in a yawing direction is received by the plane. The flat surface 306a includes: a one-side portion extending along the groove 307 over an entire length of the groove 307 on one side of the groove 307; and another-side portion extending along the groove 307 over the entire length of the groove 307 on the other side of the groove 307. The flat surface 406a includes: a portion coming into contact with the one-side part of the flat surface 306a; and the other portion coming into contact with the other-side part of the flat surface 306a. A sufficient contact area is ensured between the flat surfaces 306a and 406a.

The track surfaces 306b and 306c are curved surfaces, and therefore the mobile device 2 performs a sliding operation along a curved track between the housed state illustrated in FIG. 13 and the extended state illustrated in FIG. 14. Accordingly, in the extended state illustrated in FIG. 14, the receiver 301 and the microphone 404 can take adequate positions for telephone call.

The left base part 406 includes a biasing member 407 like a leaf spring. The biasing member 407 biases the pins 413 and 414 so as to press the tips of the pins 413 and 414 against the bottom surface 306d, respectively. The tips of the pins 413 and 414 slide along the bottom surface 306d. By providing on the bottom surface 306d a protruded portion 306e engaging with the pins 413 and 414, the upper and lower housings 300 and 400 can be fixed in the housed and extended states of the mobile device 2.

If force with which the biasing member 407 biases the pins 413 and 414 is increased, the upper and lower housings 300 and 400 can be constrained in the horizontal direction by the tips of the pins 411 to 414, and the bottom surfaces 306d and 306h. In this case, there is an advantage of being able to freely design a shape of the support component 405.

Horizontal constraint of the upper and lower housings 300 and 400 by the flat surfaces 306a and 406a is rather superior in strength.

The pin 414 preferably has a diameter smaller than that common to the pins 411 to 413 so as not to obstruct the sliding operation of the mobile device 2. The diameter of the pin 414 is determined on the basis of the diameter of the pins 411 to 413, and a dimensional tolerance of a width of the groove 307 (gap between the track surfaces 306b and 306c). In this case, a positional relationship between the upper housing 300 and the lower housing 400 is determined by three points, i.e., the pins 411 to 413. In the case where the positional relationship is determined by the three points, i.e., the pins 411 to 413, it is not necessary to form the track surfaces 306b and 306c in a bilaterally symmetrical shape. It is possible to freely design shapes of the track surfaces 306b and 306c based on a design of the mobile device 2. The pin 414 is an auxiliary pin that functions in case where any of the pins 411 to 413 is damaged or an excess load is applied to the mobile device 2. If there is no interference in terms of dimensional tolerance, the diameter of the pin 414 and that of the pins 411 to 413 may be equal to each other. Any of the pins 411 to 414 may be the auxiliary pin.

Figure 18:
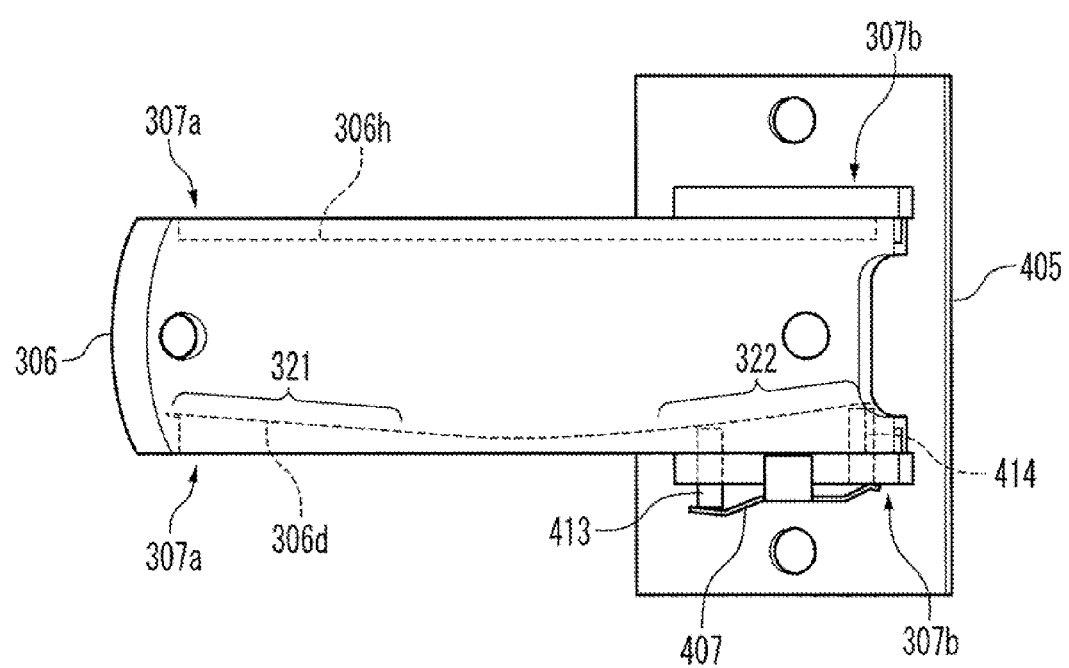
FIG. 18 is a front view illustrating a sliding mechanism according to a first modification example of the mobile device of the second exemplary embodiment.

FIG. 18 illustrates a guide part 306 and a support component 405 according to a first modification example of the mobile device 2. Shapes of right and left grooves 307 are bilaterally asymmetrical. Each of the grooves 307 includes an end part 307a, and an end part 307b on a side opposite to the end part 307a. A bottom surface 306h is a flat surface parallel to a flat surface 306a. On the other hand, a bottom surface 306d is a curved surface. The bottom surface 306d includes: a portion 321 positioned in the end part 307a; a portion 322 positioned in the end part 307b; and an intermediate portion between the parts 321 and 322. The portion 321 is sloped with respect to the flat surface 306a such that a depth of the left groove 307 is shallowed from an end part 307a side toward an end part 307b side. The portion 322 is sloped with respect to the flat surface 306a such that the depth of the left groove 307 is shallowed from the end part 307b side toward the end part 307a side. A pin 413 is arranged on a side closer to the end part 307a than a pin 414. Tips of the pins 413 and 414 come into contact with the portion 321 or 322. The portions 321 and 322 are sloped with respect to advancing and retreating directions of the pins 413 and 414, and therefore biasing force provided to the pins 413 and 414 by a biasing member 407 is converted into force that slides the upper and lower housings 300 and 400 relatively to each other. Accordingly, the sliding of the upper and lower housings 300 and 400 is assisted.

Figure 19:
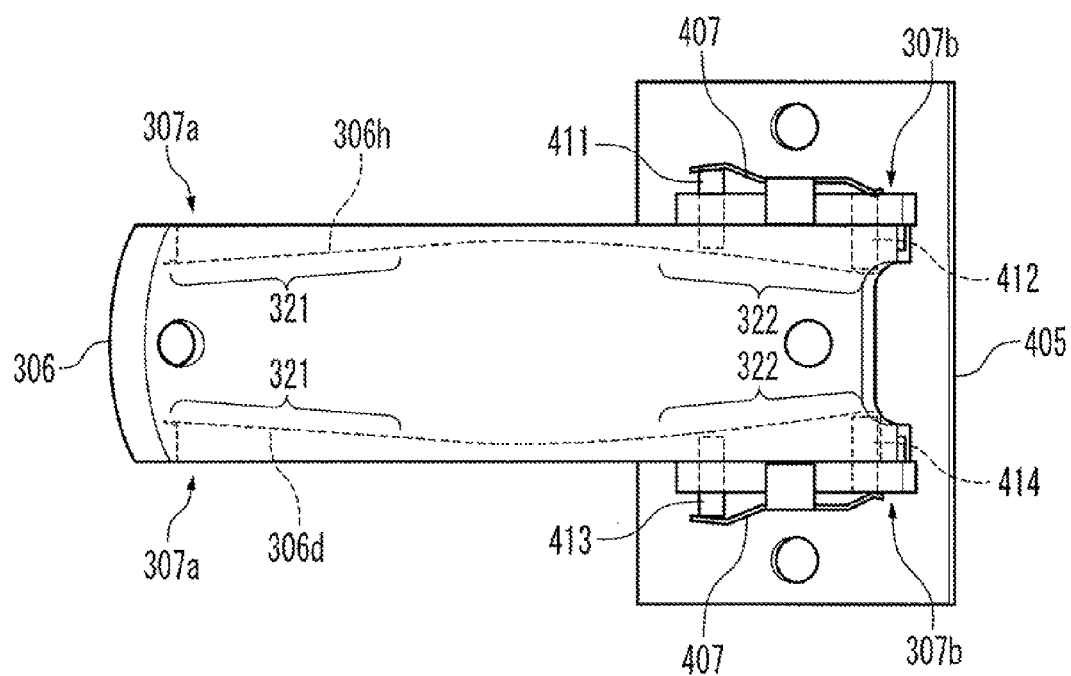
FIG. 19 is a front view illustrating a sliding mechanism according to a second modification example of the mobile device of the second exemplary embodiment.

FIG. 19 illustrates a guide part 306 and support component 405 according to a second modification example of the mobile device 2. A shape of a bottom surface 306d is the same as that illustrated in FIG. 18. A shape of a bottom surface 306h is a curved surface that is bilaterally symmetrical to the shape of the bottom surface 306d. The bottom surface 306h includes a portion 321 in an end part 307a and a portion 322 in an end part 307b, respectively. A right base part 406 supports each of pins 411 and 412 such that each of the pins 411 and 412 can advance and retreat in its axial direction. The right base part 406 includes a biasing member 407. The biasing member 407 biases the pins 411 and 412 so as to press tips of the pins 411 and 412 against the bottom surface 306h, respectively. The pin 411 is arranged on a side closer to the end part 307a than the pin 412.

Figure 20:
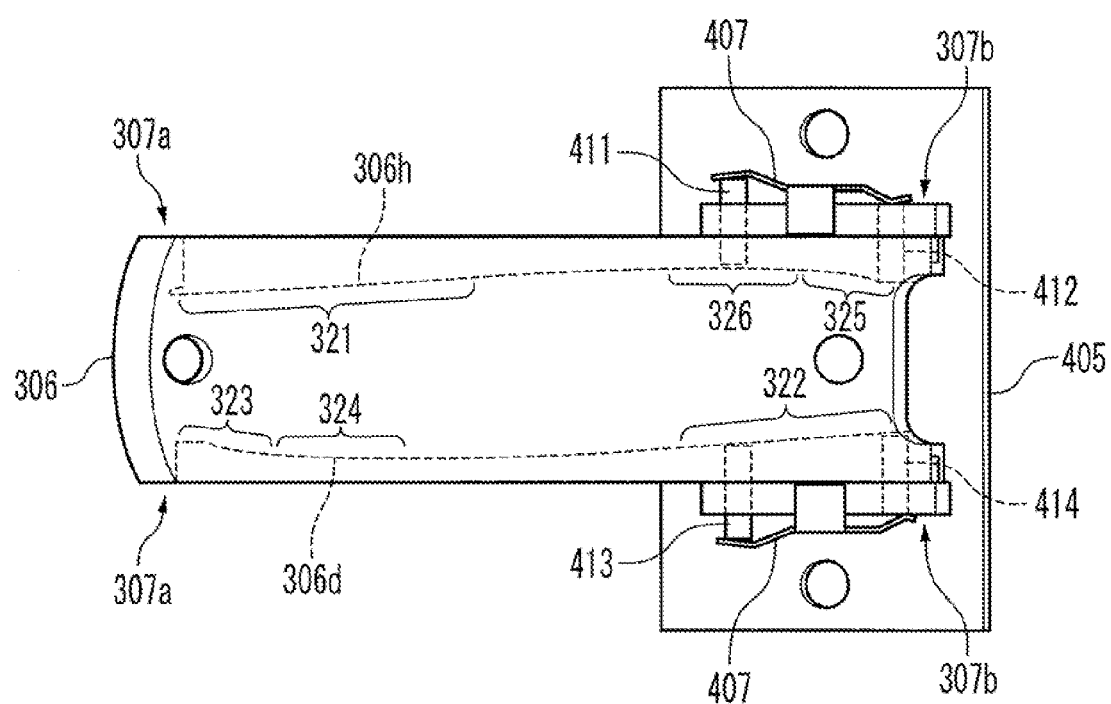
FIG. 20 is a front view illustrating a sliding mechanism according to a third modification example of the mobile device of the second exemplary embodiment.

FIG. 20, illustrates a guide part 306 and a support component 405 according to a third modification example of the mobile device 2. Bottom surfaces 306*d* and 306*h* are bilaterally asymmetrical curved surfaces. The bottom surface 306*d* includes: a portion 323 positioned in an end part 307*a*; a portion 324 adjacent to the portion 323 so as to be positioned on an end part 307*b* side of the portion 323; a portion 322 positioned in the end part 307*b*; and an intermediate portion between the parts 324 and 322. Each of the parts 323 and 324 is sloped with respect to a flat surface 306*a* such that a depth of a left groove 307 is shallowed from the end part 307*a* side toward the end part 307*b* side. The portion 324 is more moderately sloped than the portion 323. A shape of the portion 322 is the same as that illustrated in FIG. 18. The bottom surface 306*h* includes: a portion 321 positioned in an end part 307*a*; a portion 325 positioned in an end part 307*b*; a portion 326 adjacent to the portion 325 so as to be positioned on the end part 307*b* side of the portion 325; and an intermediate portion between the portions 321 and 326. The portion 321 of the bottom surface 306*h* is sloped with respect to the flat surface 306*a* such that a depth of a right groove 307 is shallowed from the end part 307*a* side toward the end part 307*b*, similarly to the shape illustrated in FIG. 19. Each of the parts 325 and 326 is sloped with respect to the flat surface 306*a* such that the depth of the right groove 307 is shallowed from the end part 307*b* side toward the end part 307*a* side. The portion 326 is more moderately sloped than the portion 325. A pin 411 is arranged on a side closer to the end part 307*a* than a pin 412. The pins 411 and 912 are supported by a right base part 406 so as to be able to advance and retreat in their axial directions. A biasing member 407 included in the right base part 406 biases the pins 911 and 912 so as to press tips of the pins 911 and 412 against the bottom surface 306*h*, respectively. A pin 413 is arranged on a side closer to the end part 307*a* than a pin 419. The pins 913 and 414 are supported by a left base part 406 so as to be able to advance and retreat in their axial directions. A biasing member 407 included in the left base part 406 biases the pins 413 and 419 so as to press tips of the pins 913 and 414 against the bottom surface 306*d*, respectively. When the mobile device 2 is in one of the housed and extended states, the tips of the pins 411, 412, 413, and 414 come into contact with the portion 326, the portion 325, an end part 307*a* side of the portion 322, and an end part 307*b* side of the portion 322, respectively. When the mobile device 2 is in the other one of the housed and extended states, the tips of the pins 911, 412, 913, and 414 come into contact with the end part 307*a* side of the portion 321, the end part 307*b* side of the portion 321, and the portion 323, and the portion 324, respectively.

Accordingly, in the housed and extended states, the upper housing 300 and the lower housing 900 are fixed. The sliding of the upper housing 300 and the lower housing 900 is assisted to become smooth. A continuous sliding operation of the upper housing 300 and the lower housing 400 is possible.

Figure 21:
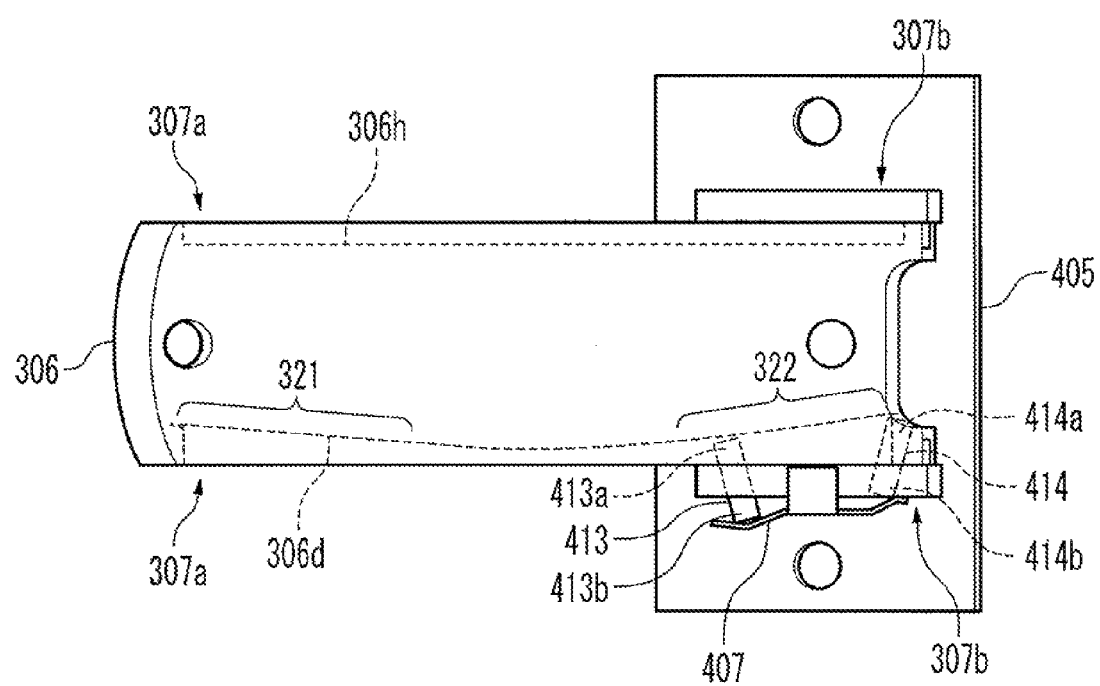
FIG. 21 is a front view illustrating a sliding mechanism according to a fourth modification example of the mobile device of the second exemplary embodiment.

FIG. 21 illustrates a guide part 306 and a support component 405 according to a fourth modification example of the mobile device 2. Pins 911 and 412 are fixed to a right base part 906. A bottom surface 306*h* is a flat surface perpendicular to the horizontal direction. A bottom surface 306*d* has a same shape as that illustrated in FIG. 18. An axial direction of a pin 413 is tilted with respect to a flat surface 406*a* (flat surface 306*a*) such that a tip 413*a* of the pin 413 is positioned on an end part 307*a* side and a base part 413*b* of the pin 913 is positioned on an end part 307*b* side. An axial direction of a pin 919 is tilted with respect to the flat surface 906*a* (flat surface 306*a*) such that a tip 914*a* of the pin 414 is positioned on the end part 307*b* side, and a base part 414*b* of the pin 414 is positioned on the end part 307*a* side. A left base part 906 supports the pins 413 and 914 such that each of the pins 413 and 414 can advance and retreat in its axial direction. When the mobile device 2 is in one of the housed and extended states, the tips 413*a* and 414*a* come into contact with the end part 307*a* side of the portion 322 and the end part 307*b* side of the portion 322, respectively. When the mobile device 2 is in the other one of the housed and extended states, the tips 413*a* and 414*a* come into contact with the end part 307*a* side of a portion 321 and the end part 307*b* side of the portion 321, respectively.

Accordingly, in the housed and extended states of the mobile device 2, the upper and lower housings 300 and 400 can be retained so as not to relatively move by using force with which a biasing member 407 biases the pins 413 and 414.

Figure 22:
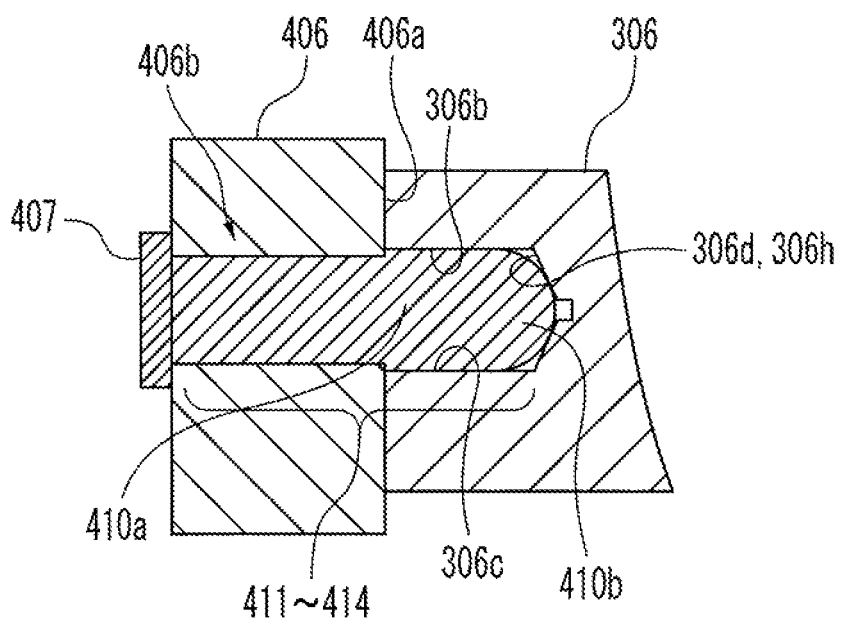
FIG. 22 is a cross-sectional view illustrating a sliding mechanism according to a fifth modification example of the mobile device of the second exemplary embodiment.

FIG. 22 illustrates a cross-sectional view of a guide part 306 and a base part 406 according to a fifth modification example of the mobile device 2. An axis of each of pins 411 to 414 is perpendicular to a flat surface 406*a*. Each of the pins 411 to 414 is supported by the base part 406 so as to be able to advance and retreat in its axial direction. Each of the pins 411 to 414 includes: a cylindrical shaped part 410*a* arranged in a groove 307; and a hemisphere shaped part 410*b* provided at a tip thereof. A biasing member 407 presses the hemisphere shaped part 410*b* of each of the pins 411 to 414 against a bottom surface 306*d* or 306*h*. Each of the bottom surfaces 306*d* and 306*h* has a V-shape in a cross section of the groove 307 (cross section illustrated in FIG. 22). The V-shaped bottom surfaces 306*d* and 306*h* are preferable in the case where the tips of the pins 411 to 414 are pressed against the bottom surfaces 306*d* and 306*h*.

In the second exemplary embodiment, as the biasing member 407, a coil spring may be used instead of the leaf spring. In the case of using the coil spring, an advance/retreat stroke of the pins 411 to 414 can be made larger.

Figure 23:
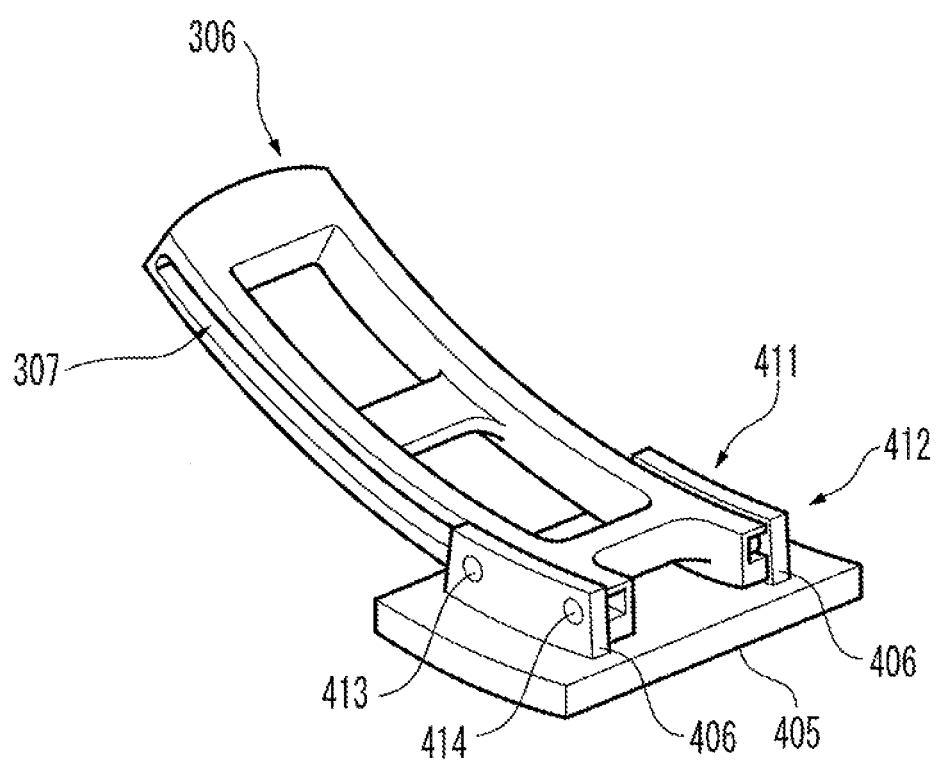
FIG. 23 is a perspective view illustrating a sliding mechanism according to a sixth modification example of the mobile device of the second exemplary embodiment.

FIG. 23 illustrates a guide part 306 and a support component 405 according to a sixth modification example of the mobile device 2. In the present modification example, the pins 411 and 412 are fixed to a right base part 406, and the pins 413 and 414 are fixed to a left base part 406.

Figure 24:
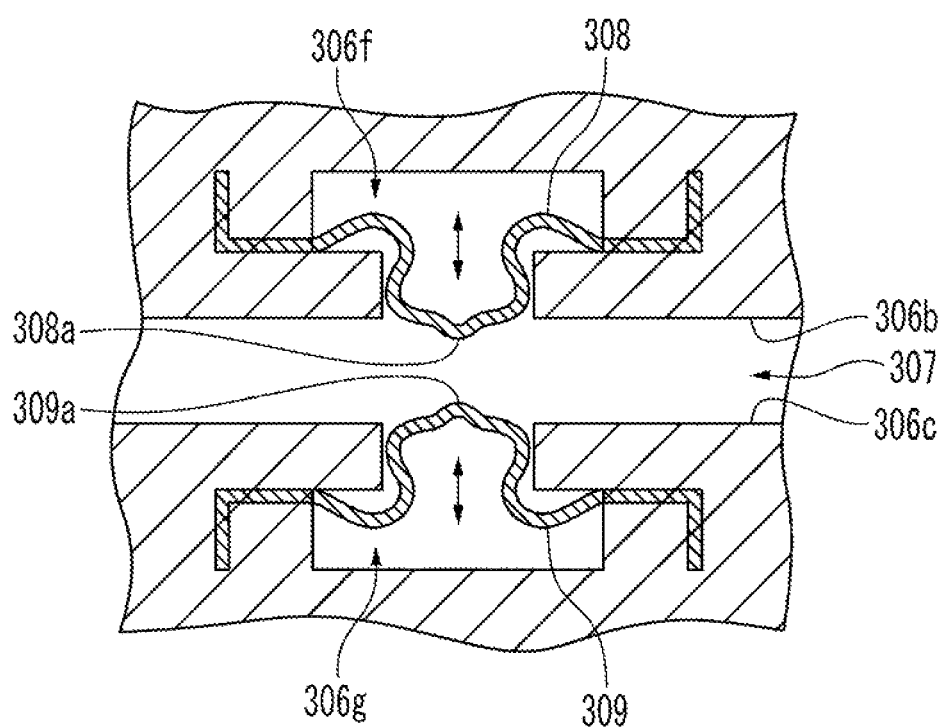
FIG. 24 is a cross-sectional view illustrating a sliding mechanism according to a seventh modification example of the mobile device of the second exemplary embodiment.

FIG. 24 illustrates a cross-sectional view of a guide part 306 according to a seventh modification example of the mobile device 2. In the guide part 306, leaf spring arrangement holes 306*f* and 306*g* respectively opening into track surfaces 306*b* and 306*c* are arranged so as to face to each other. In the leaf spring arrangement hole 306*f*, a lead spring 308 is arranged. In the leaf spring arrangement hole 306*g*, a lead spring 309 is arranged. The lead spring 308 includes: a portion fixed to the guide part 306; and an engagement part 308*a* arranged in the opening part of the leaf spring arrangement hole 306*f*. The engagement part 308*a* is biased by elastic force of the leaf spring 308 so as to protrude from the opening part of the leaf spring arrangement hole 306*f* toward the groove 307. The lead spring 309 includes: a portion fixed to the guide part 306; and an engagement part 309*a* arranged in the opening part of the leaf spring arrangement hole 306*g*. The engagement part 309*a* is biased by elastic force of the leaf spring 309 so as to protrude from the opening part of the leaf spring arrangement hole 306*g* toward the groove 307.

Cylindrical surfaces of pins 411 to 414 engage with the engagement parts 308*a* and 309*a*, and thereby the upper and lower housings 300 and 400 can be fixed to each other. If the leaf springs 308 and 309 are arranged in the end parts 307*a* and 307*b*, the upper and lower housings 300 and 400 can be fixed to each other in the housed and extended states of the mobile device 2. It sufficient fixation can be achieved, only one of the leaf springs 308 and 309 may be used.

Figure 25:
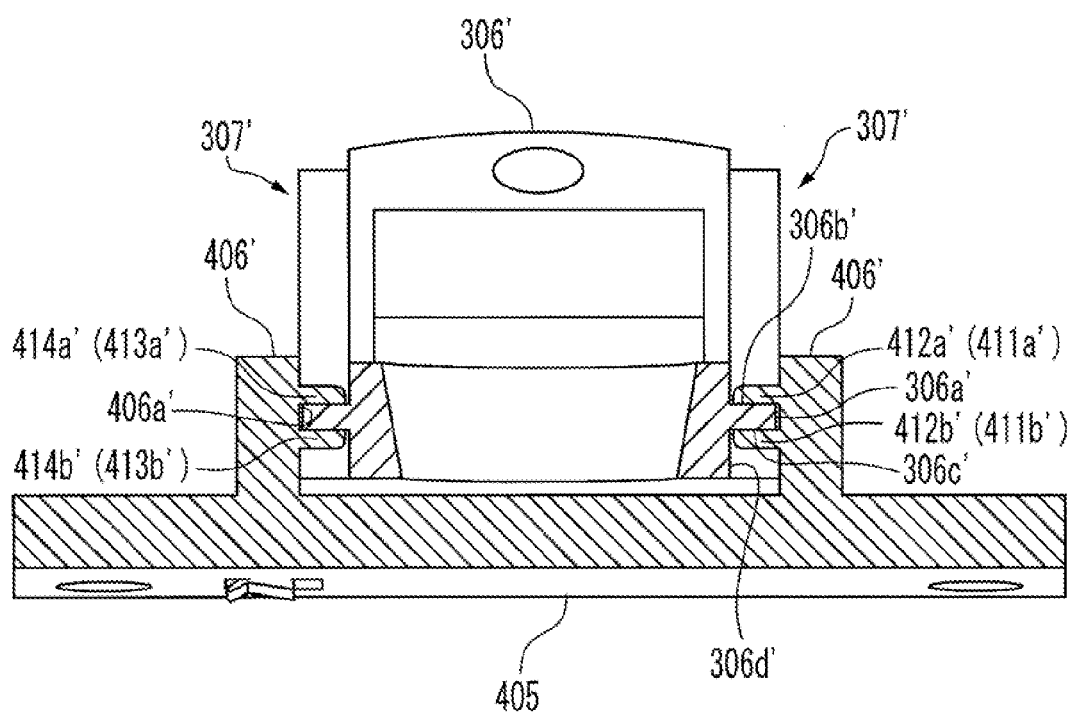
FIG. 25 is a cross-sectional view illustrating a sliding mechanism according to an eighth modification example of the mobile device of the second exemplary embodiment.

FIG. 25 illustrates a cross-sectional view of a sliding mechanism according to an eighth modification example of the mobile device 2. The guide part 306 is replaced by a guide part 306', and the base part 406 is replaced by a base part 406'. The pin 412 (411) is replaced by pins 412a' and 412b' (pins 411a' and 411b'). The pin 414 (413) is replaced by pins 414a' and 414b' (pins 413a' and 413b'). The guide part 305' includes a flat surface 306d' perpendicular to the horizontal direction. Along the flat surface 306d', a protruded strip portion 307' of a plate shape is provided. The protruded strip portion 307' includes: a flat surface 306a' perpendicular to the horizontal direction; and track surfaces 306b' and 306c' parallel to the horizontal direction. The track surfaces 306b' and 306c' have the same shapes as those of the track surfaces 306b and 306c. The track surfaces 306b' and 306c' have a relationship between a front surface and a back surface of the plate shape. The base part 406' includes a flat surface 406a' corresponding to the flat surface 406a. The flat surface 406a' is perpendicular to the horizontal direction, and faces to the flat surface 306d'. The pins 412a' and 412b' (pins 411a' and 411b') protrude leftward from the flat surface 406a' of the right base part 406'. The pins 414a' and 414b' (pins 413a' and 413b') protrude rightward from the flat surface 406a' of the left base part 406'. The pin 412a' (pin 411a') faces to the pin 412b' (pin 411b') with sandwiching the protruded strip portion 307'. The pin 414a' (pin 413a') faces to the pin 414b' (pin 413b') with sandwiching the protruded strip portion 307'. Each of the pins 411a' to 414a' includes a curved surface parallel to the horizontal direction. The curved surface has an arc shape in a cross section perpendicular to the horizontal direction. The curved surface comes into contact with the track surface 306b' along a contact line parallel to the horizontal direction. Each of the pins 411b' to 414b' includes a curved surface parallel to the horizontal direction. The curved surface has an arc shape in a cross section perpendicular to the horizontal direction. The curved surface comes into contact with the track surface 306c' along a contact line parallel to the horizontal direction. The flat surface 406a' is in contact with the flat surface 306a' with facing to the flat surface 306a'. The pins 411a' to 414a' slide along the track surface 306b', the pins 411b' to 414b' slide along the track surface 306c', and the flat surface 406a' slides along flat surface 306a', and thereby the upper and lower housings 300 and 400 is slid relatively to each other.

Figure 26:
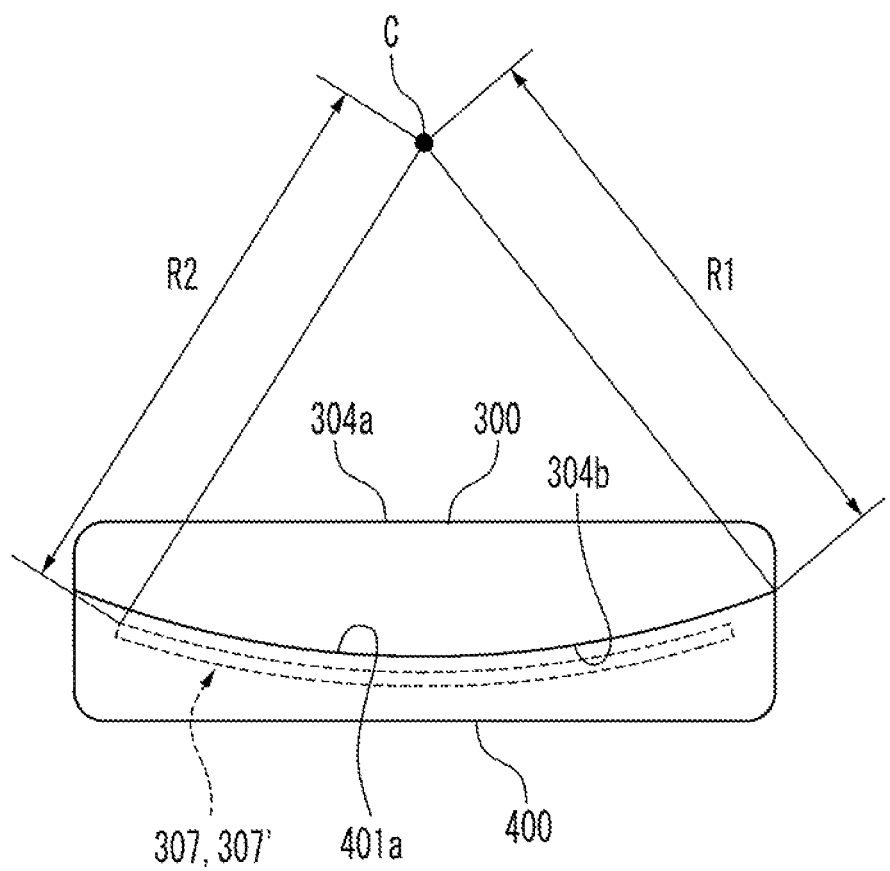
FIG. 26 is a side view of the mobile device according to the second exemplary embodiment.

FIG. 26 illustrates a side view of the mobile device 2. The mobile device 2 as viewed from the horizontal direction is illustrated. The upper housing 300 includes a back surface 304b on a side opposite to the display surface 309a. In the housed state of the mobile device 2, the back surface 304b overlaps with the key operation surface 901a with facing to the key operation surface 401a. A curvature radius R1 of the back surface 304b and the key operation surface 901a, and a curvature radius R2 of the groove 307 or the protruded strip portion 307' (e.g., a curvature radius of the track surface 306b or 306b') are different. Therefore the key operation surface 401a can be prevented from being rubbed by the upper housing 300 when the upper housing 300 and the lower housing 400 are slid relatively to each other. A curvature center C of the back surface 304b, the key operation surface 401a, the groove 307, and the protruded strip portion 307' is arranged on the upper housing 300 side.

Figure 27:
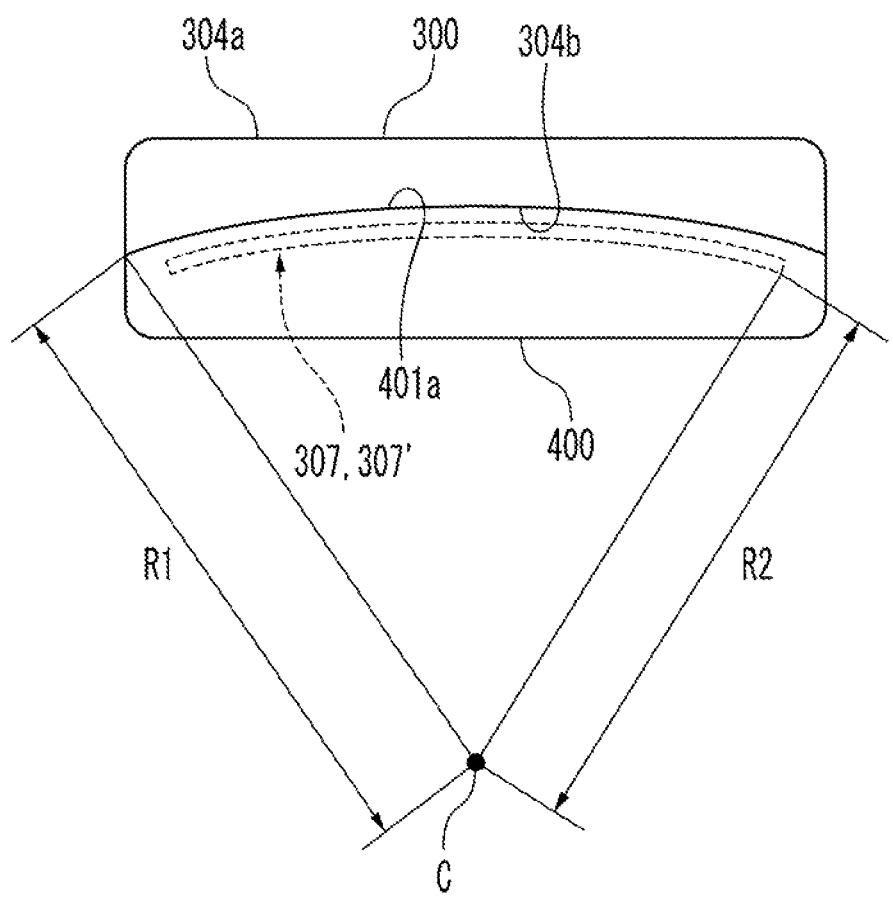
FIG. 27 is a side view of a ninth modification example of the mobile device according to the second exemplary embodiment.

FIG. 27 illustrates a side view according to a ninth modification example of the mobile device 2. The mobile device 2 as viewed from the horizontal direction is illustrated. The curvature center C of the back surface 304b, the key operation surface 401a, the groove 307, and the protruded strip portion 307' is arranged on the lower housing 400 side.

As already described, by making circular the cross-sectional shapes of the pins 211 to 214 in the mobile device 1 according to the first exemplary embodiment, and making the pins 211 to 214 rotatable, a contact position with the slit (long hole) 107 can be continuously changed.

However, the cross-sectional shapes of the pins 211 to 214 do not have to be circular.

Figure 28:
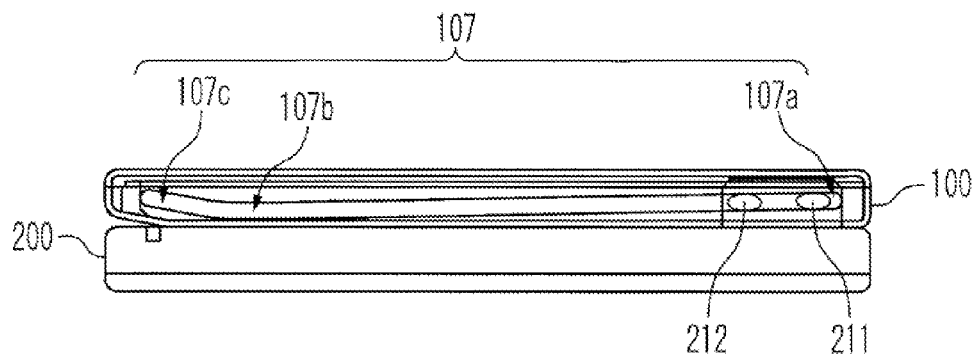
FIG. 28 is a side view illustrating a third modification example of the mobile device according to the first exemplary embodiment.
Figure 29:
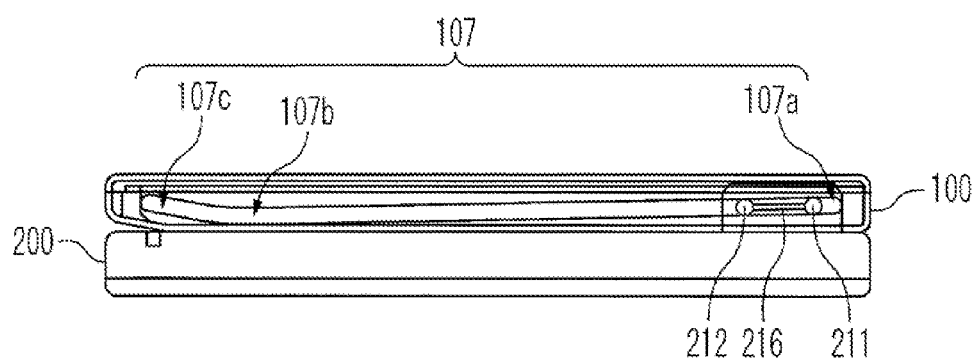
FIG. 29 is a side view illustrating a fourth modification example of the mobile device according to the first exemplary embodiment.
Figure 30:
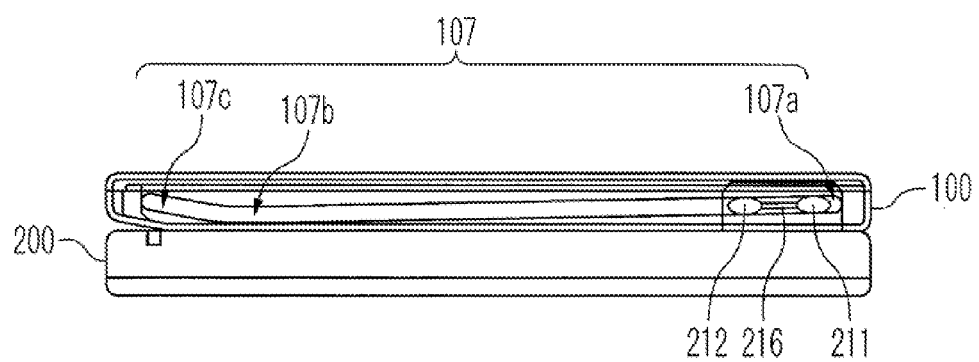
FIG. 30 is a side view illustrating a fifth modification example of the mobile device according to the first exemplary embodiment.

As illustrated in FIG. 28, the cross-sectional shapes of the pins 211 to 214 can also be made ellipsoidal. As illustrated in FIG. 29, it is also possible to connect between the pins 211 and 212 of which the cross-sectional shapes are circular with a connecting part 216, and between the pins 213 and 214 in the same manner. As illustrated in FIG. 30, it is also possible to make the cross-sectional shapes of the pins 211 to 214 ellipsoidal, connect between the pins 211 and 212 with the connecting part 216, and between the pins 213 and 214 in the same manner. The connecting part 216 is arranged in the slit (long hole) 107.

To rotate the pins 211 to 214, the configurations illustrated in FIGS. 28 to 30 are inappropriate. However, they can make shear load capacities of the pins 211 to 214 larger, and are therefore advantageous in miniaturization of the sliding mechanism. Even if the pins 211 to 214 are not rotatable but fixed, the pins 211 to 214 can be made low in friction and resistant in wear without practical problems by lubricating the surfaces of the pins 211 to 214 with oil or grease, or treating the surfaces with use of a fluorine or molybdenum based surface treatment agent.

Any of the above sliding mechanisms is simple in structure. Any of the above sliding mechanisms is small-sized. Any of the above sliding mechanisms is high in strength. Any of the above sliding mechanisms can make a stroke length longer. Any of the above sliding mechanisms can employ a sliding track in which a linear track, and curved tracks having different curvature radii are combined. Any of the above sliding mechanisms can fix the upper and lower housings to each other with an angle being formed between the display surface and the key operation surface for comfortable telephone call.

In any of the above sliding mechanisms, the pair of right and left track surfaces are provided in the grooves or on the protruded strip portions, and two pins move along one of the track surfaces, whereas at least one pin moves along the other track surface. Three or more pins move along the continuous track surfaces on both horizontal sides, and thereby a sliding track can be freely designed. Accordingly, the sliding track can be designed so as to prevent the upper housing from rubbing the key operating surface when the upper housing including the display surface is slid relatively to the lower housing including the key operation surface. The sliding track can be designed so as to form a desired angle between the display surface and the key operation surface in the extended state.

In any of the above sliding mechanisms, a position or a posture of one of the housings with respect to the other housing is determined by three pins, and therefore mutual interference between pins can be prevented. For this reason, an accuracy control of the sliding mechanism is easy, and a sliding stroke can be made larger.

In the above sliding mechanism, in the case where a cylindrical shaped pin moves along a groove, a diameter of the pin preferably coincides with a width of the groove. By making the width of the groove constant along the groove, smooth sliding is ensured, and backlash is suppressed. By using three pins, smooth sliding without backlash becomes possible.

In the above sliding mechanisms, the relative movement between one of the housings and the other housing in a direction that is perpendicular to the sliding direction and parallel to the track surface is constrained by the two flat surfaces that are in contact with each other with facing to each other.

Accordingly, in the above sliding mechanism, backlash due to wear can be suppressed. In the case where the above relative movement is constrained with tips of cylindrical shaped pins, contact areas with an opposite side member with which the pins come into contact are small, and therefore the pins and opposite side member easily wear. A method for embedding a ball capable of lubrication in the tip of the pin may be considered. In this case, it is necessary to increase a diameter of the pin.

The above sliding mechanism can fix the lower housing including the key operation surface provided with the microphone for telephone conversation and the upper housing including the display surface with a certain angle being formed between the key operation surface and the display surface. A function of fixing the housings to each other with the certain angle being formed as described is equivalent to a function of a flip type cellular phone. By forming the track surface as a continuous curved surface, the display surface is made to gradually rise with respect to the key operation surface from a state where the display surface and key operation surface are parallel to each other, and finally, as in the flip type cellular phone, the upper and lower housings can be fixed with the display surface being tilted with respect to the key operation surface.

The above sliding mechanism makes it possible to slide the lower housing including the key operation surface and the upper housing including the display surface relatively to each other so as to prevent the upper housing from coming into contact with the key operation surface. In particular, in the case where the upper housing is slid relatively to the lower housing from the housed state where the back surface that is a surface on a side opposite to the display surface of the upper housing and the key operation surface overlap with each other, the above sliding mechanism can achieve the sliding track in which the gap between the back surface and the key operation surface increases. Such the sliding track makes it possible to decrease the gap between the back surface and the key operation surface in the housed state. Accordingly, the above sliding mechanism enables a mobile device to be miniaturized.

Any of the mobile devices according to the above exemplary embodiments has an advantage that the display part is exposed even in the housed state. Any of the mobile devices according to the above exemplary embodiments further has advantages that the key operation surface can be made larger, and in the extended state, an arrangement of the microphone and receiver is in accordance with that of a mouth and an ear. The sliding mechanism including any of the mobile devices according to the above exemplary embodiments is superior in a simple structure.

In any of the above exemplary embodiments, the modifications can be combined, and the number of modifications to be combined is arbitrary.

Some of the mobile devices according to the above exemplary embodiments can be summarized, for example, as follows.

A mobile device includes a first housing and a second housing. The first housing includes a first track surface parallel to a first direction, and a first housing first flat surface perpendicular to the first direction. The second housing includes a first pin, and a second housing first flat surface facing to the first housing first flat surface. The first pin protrudes from the second housing first flat surface. The second housing first flat surface slides along the first housing first flat surface. The first pin slides along the first track surface.

The mobile device receives moment in a yawing direction on the first housing first flat surface and the second housing first flat surface. Sufficient contact areas are ensured on both of the flat surfaces, and therefore in the mobile device, smooth sliding without backlash is possible.

Preferably, the first pin protrudes in the first direction from the second housing first flat surface, and comes into contact with the first track surface along a first contact line parallel to the first direction.

The mobile device receives moment in a pitching direction on the first contact line. Accordingly, in the mobile device, smoother sliding is possible.

Preferably, a first groove is provided along the first housing first flat surface. The first track surface is a first wall surface of the first groove. Preferably, the first pin includes a cylindrical body of which an axial direction corresponds to the first direction.

Preferably, the first groove includes a first bottom surface facing to a first tip of the first pin. Preferably, the second housing includes a first base part provided with the second housing first flat surface. The first base part supports the first pin such that the first pin can advance and retreat in the first direction. The first base part includes a first biasing part that biases the first pin so as to press the first tip against the first bottom surface. The first bottom surface is provided with a protruded portion.

Preferably, the first bottom surface includes a portion that slopes with respect to the first housing first flat surface such that a depth of the first groove changes along the first groove.

Preferably, the first groove includes a first bottom surface facing to a first tip of the first pin. Preferably, the second housing includes a first base part provided with the second housing first surface. The first base part supports the first pin such that the first pin can advance and retreat in the first direction. The first base part includes a first biasing part that biases the first pin so as to press the first tip against the first bottom surface. The first bottom surface includes a portion that slopes with respect to the first housing first flat surface such that a depth of the first groove changes along the first groove.

Preferably, the first housing includes a second track surface parallel to the first direction, and a first housing second flat surface perpendicular to the first direction. Preferably, the second housing includes: second to fourth pins; a second housing second flat surface facing to the first housing second flat surface; a first base part provided with the second housing first flat surface; and a second base part provided with the second housing second flat surface. The first housing first flat surface and the first housing second flat surface face in directions opposite to each other. The second pin protrudes in the first direction from the second housing first flat surface. The third and fourth pins protrude in the first direction from the second housing second flat surface. The second pin comes into contact with the first track surface along a second contact line parallel to the first direction. The third pin comes into contact with the second track surface along a third contact line parallel to the first direction. Preferably, a first groove is provided along the first housing first flat surface. The first track surface is s first wall surface of the first groove. The first groove includes a first bottom surface. The first bottom surface faces to a first tip of the first pin and a second tip of the second pin. A second groove is provided along the first housing second flat surface. The second track surface is a second wall surface of the second groove. The second groove includes a second bottom surface. The second bottom surface faces to a third tip of the third pin and a fourth tip of the fourth pin. The first base part supports the first pin and the second pin such that the first pin and the second pin can advance and retreat in the first direction. The first base part includes a first biasing part that biases the first pin so as to press the first tip against the first bottom surface, and biases the second pin so as to press the second tip against the first bottom surface. The second base part supports the third pin and the fourth pin such that the third pin and the fourth pin can advance and retreat in the first direction. The second base part includes a second biasing part that biases the third pin so as to press the third tip against the second bottom surface, and biases the fourth pin so as to press the fourth tip against the second bottom surface. The first groove includes a first groove first end part, and a first groove second end part on a side opposite to the first groove first end part. The second groove includes a second groove first end part, and a second groove second end part on a side opposite to the second groove first end part. The first bottom surface includes: a first bottom surface first portion positioned in the first groove first end part; a first bottom surface second portion positioned in the first groove second portion; and a first bottom surface adjacent portion that is positioned on a first groove first end part side of the first bottom surface second portion, and adjacent to the first bottom surface second portion. The second bottom surface includes: a second bottom surface first portion positioned in the second groove first end part; a second bottom surface second portion positioned in the second groove second end part; and a second bottom surface adjacent portion that is positioned on a second groove second end part side of the second bottom surface first portion, and adjacent to the second bottom surface first portion. The first bottom surface first portion slopes with respect to the first housing first flat surface such that the depth of the first groove is shallowed from the first groove first end part toward the first groove second end part. Each of the first bottom surface second portion and the first bottom surface adjacent portion slopes with respect to the first housing first flat surface such that the depth of the first groove is shallowed from the first groove second end part toward the first groove first end part. The first bottom surface adjacent portion more moderately slopes than the first bottom surface second portion. Each of the second bottom surface first portion and the second bottom surface adjacent portion slopes with respect to the second housing second flat surface such that the depth of the second groove is shallowed from the second groove first end part toward the second groove second end part. The second bottom surface adjacent portion more moderately slopes than the second bottom surface first portion. The second bottom surface second end part slopes with respect to the second housing second flat surface such that the depth of the second groove is shallowed from the second groove second end part toward the second groove first end part. When the first housing and the second housing are in a shortened state, both of the first tip and the second tip come into contact with the first bottom surface first portion, the third tip comes into contact with the second bottom surface first portion, and the fourth tip comes into contact with the second bottom surface adjacent portion. When the first housing and the second housing are in an extended state, the first tip comes into contact with the first bottom surface adjacent portion, the second tip comes into contact with the first bottom surface second portion, and both of the third tip and the fourth tip come into contact with the second bottom surface second portion.

Preferably, the first housing includes a first plate-like portion. The first plate-like portion includes the first track surface, a second track surface on a side opposite to the first track surface, and the first housing first flat surface. The second track surface is parallel to the first direction. Preferably, the second housing includes a second pin that protrudes in the first direction from the second housing first flat surface. The first pin and the second pin face to each other with sandwiching the first plate-like portion. The second pin comes into contact with the second track surface along a second contact line parallel to the first direction.

Preferably, the first groove includes a first bottom surface facing to a first tip of the first pin. Preferably, the first pin includes a hemisphere shaped portion provided at the first tip. The first bottom surface is V-shaped in a cross section of the first groove.

Preferably, the first housing includes a second track surface, and a first housing second flat surface perpendicular to the first direction. The first housing first flat surface and the first housing second flat surface face in directions opposite to each other. Preferably, the second housing includes second to fourth pins, and a second housing second flat surface facing to the first housing second flat surface. The second pin protrudes in the first direction from the second housing first flat surface. Each of the third pin and the fourth pin protrudes in the first direction from the second housing second flat surface. Preferably, the first groove is provided along the first housing first flat surface. The first track surface is a first wall surface of the first groove. The second groove is provided along the first housing second flat surface. The second track surface is a second wall surface of the second groove. Preferably, the first pin includes a first pin portion arranged in the first groove. The second pin includes a second pin portion arranged in the first groove. The third pin includes a third pin portion arranged in the second groove. The fourth pin includes a fourth pin portion arranged in the second groove. Each of the first to fourth pins is a cylindrical body of which an axial direction corresponds to the first direction. The first to third pin parts have the same diameter. The fourth pin portion has a diameter smaller than that of the first to third pin parts.

Preferably, the first track surface and the second track surface are free-form surfaces.

Preferably, the second housing includes a first base part provided with the second housing first flat surface. Preferably, a first groove is provided along the first housing first flat surface. The first track surface is a first wall surface of the first groove. The first groove includes a first bottom surface. The first base part supports the first pin such that the first pin can advance and retreat in a direction of a first axis of the first pin. The first base part includes a first biasing part that biases the first pin so as to press a first tip of the first pin against the first bottom surface. The first groove includes a first groove first end part, and a first groove second end part on the side opposite to the first groove first end part. The first bottom surface includes a first bottom surface first portion positioned in the first groove first end part. The first bottom surface first portion slopes with respect to the first housing first flat surface such that the depth of the first groove is shallowed from the first groove first end part toward the first groove second end part. Preferably, the first pin includes a first pin base part on a side opposite to the first tip. The first axis tilts with respect to the second housing first flat surface such that the first tip is arranged closer to the first groove second end part than the first pin base part.

Preferably, the second housing includes a second pin. The first base part supports the second pin such that the second pin can advance and retreat in a direction of a second axis of the second pin. The first biasing part biases the second pin so as to press a second tip of the second pin against the first bottom surface. Preferably, the first bottom surface includes a first bottom surface second portion positioned in the first groove second portion. The first bottom surface second portion slopes with respect to the first housing first flat surface such that the depth of the first groove is shallowed from the first groove second end part toward the first groove first end part.

The second pin is arranged closer to the first groove first end part than the first pin. The second pin includes a second pin base part on a side opposite to the second tip. The second axis tilts with respect to the second housing first flat surface such that the second tip is arranged closer to the first groove first end part than the second pin base part.

As described above, while the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is the National Phase of PCT/JP2008/056031, filed Mar. 28, 2008 which is based upon and claims the benefit of priority from Japanese patent application No. 2007-091598 filed on Mar. 30, 2007, the disclosure of which is incorporated herein in its entirety by reference.

The invention claimed is:

1. A mobile device comprising:
a first housing; and
a second housing,
wherein said first housing includes:
a first track surface parallel to a first direction, and
a first housing first flat surface perpendicular to said first direction,
wherein said second housing includes:
a first pin, and
a second housing first flat surface facing to said first housing first flat surface,
wherein said first pin protrudes in said first direction from said second housing first flat surface,
wherein said second housing first flat surface slides along said first housing first flat surface, and
wherein said first pin slides along said first track surface,
wherein said first housing includes:
a second track surface, and
a first housing second flat surface perpendicular to said first direction,
wherein said first housing first flat surface and said first housing second flat surface face in directions opposite to each other,
wherein said second housing includes:
second to fourth pins, and
a second housing second flat surface facing to said first housing second flat surface,
wherein said second pin protrudes in said first direction from said second housing first flat surface,
wherein each of said third pin and said fourth pin protrudes in said first direction from said second housing second flat surface,
wherein said first groove is provided along said first housing first flat surface,
wherein said first track surface is a first wall surface of said first groove,
wherein said second groove is provided along said first housing second flat surface,
wherein said second track surface is a second wall surface of said second groove,
wherein said first pin includes:
a first pin portion arranged in said first groove,
wherein said second pin includes:
a second pin portion arranged in said first groove,
wherein said third pin includes:
a third pin portion arranged in said second groove,
wherein said fourth pin includes:
a fourth pin portion arranged in said second groove,
wherein each of said first to fourth pins is a cylindrical body of which an axial direction corresponds to said first direction,
wherein said first to third pin parts have said same diameter, and
wherein said fourth pin portion has a diameter smaller than that of said first to third pin parts.

2. The mobile device according to claim 1,
wherein said first pin comes into contact with said first track surface along a first contact line parallel to said first direction.

3. The mobile device according to claim 2, wherein a first groove is provided along said first housing first flat surface,
wherein said first track surface is a first wall surface of said first groove, and
wherein said first pin includes:
a cylindrical body of which an axial direction corresponds to said first direction.

4. The mobile device according to claim 3, wherein said first groove includes a first bottom surface facing to a first tip of said first pin,
wherein said second housing includes:
a first base part provided with said second housing first flat surface,
wherein said first base part supports said first pin such that said first pin can advance and retreat in said first direction,
wherein said first base part includes:
a first biasing part that biases said first pin so as to press said first tip against said first bottom surface, and
wherein said first bottom surface is provided with a protruded portion.

5. The mobile device according to claim 4, wherein said first bottom surface includes:
a portion that slopes with respect to said first housing first flat surface such that the depth of said first groove changes along said first groove.

6. The mobile device according to claim 3, wherein said first groove includes:
a first bottom surface facing to a first tip of said first pin,
wherein said second housing includes:
a first base part provided with said second housing first surface,
wherein said first base part supports said first pin such that said first pin can advance and retreat in said first direction,
wherein said first base part includes:
a first biasing part that biases said first pin so as to press said first tip against said first bottom surface, and
wherein said first bottom surface includes a portion that slopes with respect to said first housing first flat surface such that the depth of said first groove changes along said first groove.

7. The mobile device according to claim 2, wherein said first housing includes:
a second track surface parallel to said first direction, and
a first housing second flat surface perpendicular to said first direction,
wherein said second housing includes:
second to fourth pins,
a second housing second flat surface facing to said first housing second flat surface,
a first base part provided with said second housing first flat surface, and
a second base part provided with said second housing second flat surface, wherein said first housing first flat surface and said first housing second flat surface face in directions opposite to each other,
wherein said second pin protrudes in said first direction from said second housing first flat surface,
wherein said third and fourth pins protrude in said first direction from said second housing second flat surface,
wherein said second pin comes into contact with said first track surface along a second contact line parallel to said first direction,
wherein said third pin comes into contact with said second track surface along a third contact line parallel to said first direction,
wherein a first groove is provided along said first housing first flat surface,
wherein said first track surface is s first wall surface of said first groove,
wherein said first groove includes:
a first bottom surface,
wherein said first bottom surface faces to a first tip of said first pin and a second tip of said second pin,
wherein a second groove is provided along said first housing second flat surface,
wherein said second track surface is a second wall surface of said second groove,
wherein said second groove includes:
a second bottom surface,
wherein said second bottom surface faces to a third tip of said third pin and a fourth tip of said fourth pin,
wherein said first base part supports said first pin and said second pin such that said first pin and said second pin can advance and retreat in said first direction,
wherein said first base part includes:
a first biasing part that biases said first pin so as to press said first tip against said first bottom surface, and biases said second pin so as to press said second tip against said first bottom surface,
wherein said second base part supports said third pin and said fourth pin such that said third pin and said fourth pin can advance and retreat in said first direction,
wherein said second base part includes:
a second biasing part that biases said third pin so as to press said third tip against said second bottom surface, and biases said fourth pin so as to press said fourth tip against said second bottom surface,
wherein said first groove includes:
a first groove first end part, and
a first groove second end part on a side opposite to said first groove first end part,
wherein said second groove includes:
a second groove first end part, and
a second groove second end part on a side opposite to said second groove first end part,
wherein said first bottom surface includes:
a first bottom surface first portion positioned in said first groove first end part,
a first bottom surface second portion positioned in said first groove second portion, and
a first bottom surface adjacent portion that is positioned on a first groove first end part side of said first bottom surface second portion, and adjacent to said first bottom surface second portion,
wherein said second bottom surface includes:
a second bottom surface first portion positioned in said second groove first end part,
a second bottom surface second portion positioned in said second groove second end part, and
a second bottom surface adjacent portion that is positioned on a second groove second end part side of said second bottom surface first portion, and adjacent to said second bottom surface first portion,
wherein said first bottom surface first portion slopes with respect to said first housing first flat surface such that the depth of said first groove is shallowed from said first groove first end part toward said first groove second end part,
wherein each of said first bottom surface second portion and said first bottom surface adjacent portion slopes with respect to said first housing first flat surface such that the depth of said first groove is shallowed from said first groove second end part toward said first groove first end part,
wherein said first bottom surface adjacent portion more moderately slopes than said first bottom surface second portion,
wherein each of said second bottom surface first portion and said second bottom surface adjacent portion slopes with respect to said second housing second flat surface such that the depth of said second groove is shallowed from said second groove first end part toward said second groove second end part,
wherein said second bottom surface adjacent portion more moderately slopes than said second bottom surface first portion,
wherein said second bottom surface second end part slopes with respect to said second housing second flat surface such that the depth of said second groove is shallowed from said second groove second end part toward said second groove first end part,
when said first housing and said second housing are in a shortened state, both of said first tip and said second tip come into contact with said first bottom surface first portion, said third tip comes into contact with said second bottom surface first portion, and said fourth tip comes into contact with said second bottom surface adjacent portion, and
when said first housing and said second housing are in an extended state, said first tip comes into contact with said first bottom surface adjacent portion, said second tip comes into contact with said first bottom surface second portion, and both of said third tip and said fourth tip come into contact with said second bottom surface second portion.

8. The mobile device according to claim 2, wherein said first housing includes:
a first plate-like portion,
wherein said first plate-like portion includes:
said first track surface,
a second track surface on a side opposite to said first track surface, and
said first housing first flat surface,
wherein said second track surface is parallel to said first direction,
wherein said second housing includes:
a second pin that protrudes in said first direction from said second housing first flat surface,
wherein said first pin and said second pin face to each other with sandwiching said first plate-like portion, and
wherein said second pin comes into contact with said second track surface along a second contact line parallel to said first direction.

9. The mobile device according to claim 3, wherein said first groove includes:
a first bottom surface facing to a first tip of said first pin, wherein said first pin includes:
a hemisphere shaped portion provided at said first tip, wherein said first bottom surface is V-shaped in a cross section of said first groove.

10. The mobile device according to claim 2, wherein said first track surface and said second track surface are free-form surfaces.

11. The mobile device according to claim 1, wherein said second housing includes:
a first base part provided with said second housing first flat surface,
wherein a first groove is provided along said first housing first flat surface,
wherein said first track surface is a first wall surface of said first groove,
wherein said first groove includes:
a first bottom surface,
wherein said first base part supports said first pin such that said first pin can advance and retreat in a direction of a first axis of said first pin,
wherein said first base part includes:
a first biasing part that biases said first pin so as to press a first tip of said first pin against said first bottom surface,
wherein said first groove includes:
a first groove first end part, and
a first groove second end part on said side opposite to said first groove first end part,
wherein said first bottom surface includes:
a first bottom surface first portion positioned in said first groove first end part,
wherein said first bottom surface first portion slopes with respect to said first housing first flat surface such that the depth of said first groove is shallowed from said first groove first end part toward said first groove second end part,
wherein said first pin includes:
a first pin base part on a side opposite to said first tip,
wherein said first axis tilts with respect to said second housing first flat surface such that said first tip is arranged closer to said first groove second end part than said first pin base part.

12. The mobile device according to claim 11, wherein said second housing includes:
a second pin,
wherein said first base part supports said second pin such that said second pin can advance and retreat in a direction of a second axis of said second pin,
wherein said first biasing part biases said second pin so as to press a second tip of said second pin against said first bottom surface,
wherein said first bottom surface includes:
a first bottom surface second portion positioned in said first groove second portion,
wherein said first bottom surface second portion slopes with respect to said first housing first flat surface such that the depth of said first groove is shallowed from said first groove second end part toward said first groove first end part,
wherein said second pin is arranged closer to said first groove first end part than said first pin,
wherein said second pin includes:
a second pin base part on a side opposite to said second tip, and
wherein said second axis tilts with respect to said second housing first flat surface such that said second tip is arranged closer to said first groove first end part than said second pin base part.

13. A mobile device comprising:
a first housing; and
a second housing,
wherein said first housing includes:
a first track surface, and
a first housing first flat surface extended in a direction where said first track surface is extended and provided perpendicularly to said first track surface,
wherein said second housing includes:
a first pin, and
a second housing first flat surface facing to said first housing first flat surface,
wherein said first pin protrudes from said second housing first flat surface,
wherein said second housing first flat surface slides along said first housing first flat surface, and
wherein said first pin slides along said first track surface,
wherein said first housing includes:
a second track surface, and
a first housing second flat surface extended in a direction where said second track surface is extended and provided perpendicularly to said second track surface,
wherein said first housing first flat surface and said first housing second flat surface face in directions opposite to each other,
wherein said second housing includes:
second to fourth pins, and
a second housing second flat surface facing to said first housing second flat surface,
wherein said second pin protrudes from said second housing first flat surface,
wherein each of said third pin and said fourth pin protrudes from said second housing second flat surface,
wherein said first groove is provided along said first housing first flat surface,
wherein said first track surface is a first wall surface of said first groove,
wherein said second groove is provided along said first housing second flat surface,
wherein said second track surface is a second wall surface of said second groove,
wherein said first pin includes:
a first pin portion arranged in said first groove,
wherein said second pin includes:
a second pin portion arranged in said first groove,
wherein said third pin includes:
a third pin portion arranged in said second groove,
wherein said fourth pin includes:
a fourth pin portion arranged in said second groove.

14. The mobile device according to claim 13, wherein each of said first to fourth pins is a cylindrical body of which an axial direction corresponds to said first direction,
wherein said first to third pin parts have said same diameter, and
wherein said fourth pin portion has a diameter smaller than that of said first to third pin parts.

15. The mobile device according to claim 14, wherein each of said first pin and said second pin protrudes from said second housing first flat surface such that said first pin and said second pin are located on said first track surface, and wherein each of said third pin and said fourth pin protrudes from said second housing second flat surface such that said third pin and said fourth pin are located on said second track surface.

* * * * *